(12) United States Patent
Kim et al.

(10) Patent No.: US 7,885,059 B2
(45) Date of Patent: Feb. 8, 2011

(54) PORTABLE COMPUTER AND METHOD FOR MOUNTING A FLAT PANEL DISPLAY DEVICE THEREON

(75) Inventors: Jong Hwan Kim, Kyunggi-Do (KR); Young Woo Cho, Kyunggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/787,933

(22) Filed: Feb. 27, 2004

(65) Prior Publication Data

US 2004/0165346 A1 Aug. 26, 2004

Related U.S. Application Data

(60) Division of application No. 10/294,548, filed on Nov. 15, 2002, now abandoned, which is a continuation of application No. 09/285,338, filed on Apr. 2, 1999, now Pat. No. 6,501,641.

(30) Foreign Application Priority Data

Oct. 23, 1998 (KR) ............... 1998-44475
Oct. 27, 1998 (KR) ............... 1998-44973

(51) Int. Cl.
  *H05K 7/16* (2006.01)
(52) U.S. Cl. ............ 361/679.21; 361/679.22; 248/917; 16/382; 349/58
(58) Field of Classification Search ........ 361/681, 361/683, 682, 679.21, 679.26, 679.27, 679.09, 361/679.02; 349/58–60; 248/917–924; 16/382, 16/389
See application file for complete search history.

(56) References Cited

U.S. PATENT DOCUMENTS

| | | | |
|---|---|---|---|
| 4,111,533 A | 9/1978 | Nakamura et al. | |
| 4,165,607 A | 9/1978 | Nakamura et al. | |
| 4,267,555 A | 5/1981 | Boyd | |
| 4,422,728 A | 12/1983 | Andreaggi | |
| 4,552,418 A | 11/1985 | Sarnezki | |

(Continued)

FOREIGN PATENT DOCUMENTS

DE 41 20 950 11/1998

(Continued)

OTHER PUBLICATIONS

Lee et al. (US 2004/0090567 A1), "Liquid Crystal Display Module and an Assembly Method Therefore", May 13, 2004.*

(Continued)

*Primary Examiner*—Jayprakash N Gandhi
*Assistant Examiner*—Ingrid Wright
(74) *Attorney, Agent, or Firm*—McKenna Long & Aldridge

(57) ABSTRACT

A portable computer including a housing having first and second sections, the first section having an information input device and the second section having a case having a first fastening element; a display panel including a second fastening element at a rear surface of the panel, the case and the display panel being attached through the first and second fastening elements; a hinge coupling the first and the second sections to each other; and a display panel support member having a third fastening element, the display panel support member being attached to the display panel through the third fastening element.

31 Claims, 16 Drawing Sheets

U.S. PATENT DOCUMENTS

| | | | |
|---|---|---|---|
| 4,562,987 A | 1/1986 | Leeds |
| 4,567,835 A | 2/1986 | Reese |
| 4,614,406 A | 9/1986 | Motoi |
| 4,690,632 A | 9/1987 | Carrow |
| 4,755,035 A | 7/1988 | Kopish |
| 4,781,422 A | 11/1988 | Kimble |
| 4,796,977 A | 1/1989 | Drake |
| 4,830,328 A | 5/1989 | Takach |
| 4,834,329 A | 5/1989 | Delapp |
| 4,932,620 A | 6/1990 | Foy |
| 4,937,709 A | 6/1990 | Yanagi et al. |
| 4,959,887 A | 10/1990 | Gruenberg et al. |
| 5,001,468 A | 3/1991 | Brice et al. |
| 5,002,368 A | 3/1991 | Anglin |
| 5,041,965 A | 8/1991 | Chen |
| 5,085,394 A | 2/1992 | Torii |
| 5,102,084 A | 4/1992 | Park |
| 5,103,376 A | 4/1992 | Blonder |
| 5,103,377 A | 4/1992 | Kobayashi et al. |
| 5,119,204 A | 6/1992 | Hashimoto et al. |
| D328,291 S | 7/1992 | Falkner |
| 5,128,662 A | 7/1992 | Failla |
| 5,168,426 A | 12/1992 | Hoving |
| 5,173,837 A | 12/1992 | Blackwell et al. |
| 5,177,616 A | 1/1993 | Riday |
| 5,195,213 A | 3/1993 | Ohgami et al. |
| 5,195,709 A | 3/1993 | Yasushi |
| 5,196,993 A | 3/1993 | Herron |
| 5,200,913 A | 4/1993 | Hawkins |
| 5,206,790 A | 4/1993 | Thomas et al. |
| 5,216,411 A | 6/1993 | Ashitomi et al. |
| 5,233,502 A | 8/1993 | Beatty et al. |
| 5,238,421 A | 8/1993 | Kobayashi |
| D339,796 S | 9/1993 | Goodner |
| 5,255,214 A | 10/1993 | Ma |
| 5,264,992 A | 11/1993 | Hogdahl et al. |
| 5,268,816 A | 12/1993 | Abell, Jr. et al. |
| 5,268,817 A | 12/1993 | Miyagawa et al. |
| 5,272,601 A | 12/1993 | McKillip |
| 5,276,589 A | 1/1994 | Bartlett et al. |
| 5,299,017 A | 3/1994 | Furuno |
| 5,313,318 A | 5/1994 | Gruenberg et al. |
| 5,321,579 A | 6/1994 | Brown |
| 5,328,379 A | 7/1994 | Kobayashi |
| 5,329,289 A | 7/1994 | Sakamoto |
| 5,347,630 A | 9/1994 | Ishizawa |
| 5,363,227 A | 11/1994 | Ichikawa et al. |
| 5,363,276 A | 11/1994 | Crockett |
| 5,374,104 A | 12/1994 | Moore |
| 5,379,182 A | 1/1995 | Fujimori et al. |
| 5,379,187 A | 1/1995 | Fujimori et al. |
| D356,077 S | 3/1995 | Harada et al. |
| 5,422,751 A | 6/1995 | Lewis et al. |
| 5,423,605 A | 6/1995 | Liu |
| 5,432,626 A | 7/1995 | Sasuga et al. |
| 5,434,964 A | 7/1995 | Moss |
| 5,467,106 A | 11/1995 | Salomon |
| 5,467,504 A | 11/1995 | Yang |
| 5,479,285 A | 12/1995 | Burke |
| 5,483,253 A | 1/1996 | Suganuma et al. |
| 5,486,942 A | 1/1996 | Ichikawa et al. |
| 5,494,447 A | 2/1996 | Zaldan |
| 5,503,361 A | 4/1996 | Kan-O |
| 5,504,605 A | 4/1996 | Sakuma et al. |
| 5,546,270 A | 8/1996 | Konno et al. |
| 5,559,670 A | 9/1996 | Flint et al. |
| 5,565,889 A | 10/1996 | Crooks |
| 5,566,048 A | 10/1996 | Esterberg et al. |
| 5,568,357 A | 10/1996 | Kochis et al. |
| 5,570,267 A | 10/1996 | Ma |
| 5,571,548 A | 11/1996 | Lynch |
| 5,583,529 A | 12/1996 | Satou |
| 5,583,681 A | 12/1996 | Shioya |
| 5,590,021 A | 12/1996 | Register |
| 5,619,351 A | 4/1997 | Funamoto et al. |
| 5,634,351 A | 6/1997 | Larson et al. |
| 5,636,101 A | 6/1997 | Bonsall et al. |
| 5,636,102 A | 6/1997 | Fujino |
| 5,644,516 A | 7/1997 | Podwalny et al. |
| 5,651,594 A | 7/1997 | Lechman |
| 5,654,779 A | 8/1997 | Nakayama |
| 5,659,376 A | 8/1997 | Uehara |
| 5,666,172 A | 9/1997 | Ida et al. |
| 5,666,261 A | 9/1997 | Aguilera |
| 5,667,179 A | 9/1997 | Rosen |
| 5,668,695 A | 9/1997 | Nakamura |
| 5,680,183 A | 10/1997 | Sasuga et al. |
| 5,682,645 A | 11/1997 | Watabe |
| 5,689,400 A | 11/1997 | Ohgami et al. |
| 5,708,561 A | 1/1998 | Huilgol |
| 5,717,566 A | 2/1998 | Tao |
| 5,751,548 A | 5/1998 | Hall |
| 5,764,314 A | 6/1998 | Narayan |
| 5,768,096 A | 6/1998 | Williams |
| 5,771,539 A | 6/1998 | Wahlstedt et al. |
| 5,774,233 A | 6/1998 | Sakamoto |
| 5,774,333 A * | 6/1998 | Janik et al. ............. 361/679.26 |
| 5,777,704 A | 7/1998 | Selker |
| 5,781,407 A | 7/1998 | Brauel |
| 5,786,983 A | 7/1998 | Brenner |
| 5,805,117 A | 9/1998 | Mazurek et al. |
| 5,805,125 A | 9/1998 | Suganuma et al. |
| 5,812,368 A | 9/1998 | Chen |
| 5,815,225 A | 9/1998 | Nelson |
| 5,825,613 A | 10/1998 | Holden |
| 5,831,816 A | 11/1998 | Johns et al. |
| 5,835,139 A * | 11/1998 | Yun et al. ..................... 349/58 |
| 5,835,343 A | 11/1998 | Johns et al. |
| 5,844,772 A | 12/1998 | Lee et al. |
| 5,844,774 A | 12/1998 | Gushiken et al. |
| 5,868,495 A | 2/1999 | Fujimori |
| 5,872,006 A | 2/1999 | Kim |
| 5,872,604 A | 2/1999 | Kim |
| 5,872,606 A | 2/1999 | Kim |
| 5,889,623 A | 3/1999 | Ueda et al. |
| 5,905,550 A | 5/1999 | Ohgami et al. |
| 5,923,528 A | 7/1999 | Lee |
| 5,926,237 A | 7/1999 | Yun |
| 5,946,061 A | 8/1999 | Kurihara et al. |
| 5,947,440 A | 9/1999 | Cho |
| 5,973,915 A | 10/1999 | Evans |
| 5,992,809 A | 11/1999 | Sweere |
| 6,002,457 A | 12/1999 | Yun |
| 6,002,582 A | 12/1999 | Yeager |
| 6,003,052 A | 12/1999 | Yamagata |
| 6,018,847 A | 2/2000 | Lu |
| 6,020,942 A | 2/2000 | Yun et al. |
| 6,031,714 A | 2/2000 | Ma |
| 6,061,231 A | 5/2000 | Crockett |
| 6,064,455 A | 5/2000 | Kim |
| 6,064,565 A | 5/2000 | Ishihara et al. |
| 6,068,227 A | 5/2000 | Morgan et al. |
| 6,076,786 A | 6/2000 | Meyer |
| 6,081,420 A | 6/2000 | Kim |
| 6,094,340 A | 7/2000 | Min |
| 6,128,183 A | 10/2000 | Uchiyama et al. |
| 6,130,658 A | 10/2000 | Yamamoto |
| 6,134,103 A | 10/2000 | Ghanma |
| 6,144,423 A | 11/2000 | Kim |
| 6,163,350 A | 12/2000 | Ihara |
| 6,166,788 A * | 12/2000 | Ha et al. ..................... 349/58 |
| 6,168,124 B1 | 1/2001 | Matsuoka |
| 6,168,250 B1 | 1/2001 | Rogov |
| 6,188,569 B1 | 2/2001 | Minemoto et al. |

| | | | |
|---|---|---|---|
| 6,189,850 B1 | 2/2001 | Liao | |
| 6,191,937 B1 | 2/2001 | Bang | |
| 6,212,067 B1 | 4/2001 | Nakajima | |
| 6,216,989 B1 | 4/2001 | Shioya | |
| 6,231,021 B1 | 5/2001 | Hong | |
| 6,233,139 B1 | 5/2001 | Hamon | |
| 6,266,236 B1 | 7/2001 | Ku | |
| 6,272,006 B1 * | 8/2001 | Lee | 361/681 |
| 6,275,376 B1 | 8/2001 | Moon | |
| 6,285,427 B1 | 9/2001 | Lee et al. | |
| 6,288,891 B1 | 9/2001 | Hasegawa | |
| 6,302,612 B1 | 10/2001 | Fowler | |
| 6,304,432 B1 | 10/2001 | Kim | |
| 6,307,530 B1 | 10/2001 | Cho | |
| 6,330,148 B1 | 12/2001 | Won et al. | |
| 6,373,537 B2 | 4/2002 | Yun | |
| 6,396,472 B1 | 5/2002 | Jacklin | |
| 6,411,501 B1 | 6/2002 | Cho | |
| 6,494,429 B2 | 12/2002 | Tajima | |
| 6,498,718 B1 | 12/2002 | Kim et al. | |
| 6,501,641 B1 | 12/2002 | Kim et al. | |
| 6,512,558 B2 | 1/2003 | Kim | |
| 6,594,143 B2 | 7/2003 | Yano | |
| 6,618,240 B1 | 9/2003 | Kim | |
| 6,639,788 B1 | 10/2003 | Liao | |
| 6,693,794 B2 | 2/2004 | Kim | |
| 6,731,354 B2 | 5/2004 | Menard | |
| 6,838,810 B1 | 1/2005 | Bovio | |
| 6,856,362 B2 | 2/2005 | Sasuga | |
| 7,006,167 B2 | 2/2006 | Kashimoto | |
| 7,154,571 B2 | 12/2006 | Fukayama et al. | |
| 2002/0186526 A1 | 12/2002 | Kim | |
| 2003/0189681 A1 | 10/2003 | Han et al. | |

FOREIGN PATENT DOCUMENTS

| | | |
|---|---|---|
| EP | 0 425 793 | 5/1989 |
| EP | 1 052 536 A3 | 1/1991 |
| EP | 0 454 120 | 5/1991 |
| EP | 0 532 284 | 10/1991 |
| EP | 0 317 261 | 12/1992 |
| EP | 0 587 144 | 3/1993 |
| EP | 0 604 872 | 3/1994 |
| EP | 0 620 473 | 7/1994 |
| EP | 0 880 049 A1 | 2/2001 |
| GB | 2170035 A | 7/1986 |
| GB | 2 305 689 | 10/1994 |
| GB | 2 305 690 | 4/1997 |
| GB | 2-319110 | 5/1998 |
| GB | 2319110 A | 5/1998 |
| JP | S52-045367 | 9/1977 |
| JP | S62-137479 | 2/1984 |
| JP | 60-91386 | 5/1985 |
| JP | S62-269931 | 8/1987 |
| JP | H01-094983 | 11/1987 |
| JP | H01-059223 | 4/1989 |
| JP | H01-211721 | 4/1989 |
| JP | H03-006670 | 4/1989 |
| JP | H01-237591 | 9/1989 |
| JP | H02-079893 | 3/1990 |
| JP | H02-083573 | 6/1990 |
| JP | H02-244190 | 9/1990 |
| JP | H03-156488 | 7/1991 |
| JP | H03-200282 | 9/1991 |
| JP | H04-020086 | 2/1992 |
| JP | H04-051595 | 2/1992 |
| JP | H04-056822 | 2/1992 |
| JP | 04-134900 | 5/1992 |
| JP | H04-326456 | 11/1992 |
| JP | H05-042853 | 2/1993 |
| JP | H05-080344 | 4/1993 |
| JP | H05-036423 | 5/1993 |
| JP | 05-188810 | 7/1993 |
| JP | H05-050428 | 7/1993 |
| JP | H07-099394 | 9/1993 |
| JP | H06-021018 | 3/1994 |
| JP | H06-021079 | 3/1994 |
| JP | H03-001011 | 6/1994 |
| JP | H06-348364 | 12/1994 |
| JP | H07-199180 | 8/1995 |
| JP | H07-261187 | 10/1995 |
| JP | H07-281184 | 10/1995 |
| JP | H07-044577 | 11/1995 |
| JP | H07-044579 | 11/1995 |
| JP | 8-28545 | 2/1996 |
| JP | 8-76886 | 3/1996 |
| JP | 8-211964 | 8/1996 |
| JP | H09-026753 | 1/1997 |
| JP | 9-91059 | 4/1997 |
| JP | S59-020273 | 4/1997 |
| JP | H09-113880 | 5/1997 |
| JP | 09-171358 | 6/1997 |
| JP | H09-146466 | 6/1997 |
| JP | 09-190156 | 7/1997 |
| JP | H09-199875 | 7/1997 |
| JP | H09-297542 | 11/1997 |
| JP | H09-311319 | 12/1997 |
| JP | 10-133181 | 5/1998 |
| JP | 10-117313 | 6/1998 |
| JP | H10-301095 | 11/1998 |
| JP | 11-6998 | 1/1999 |
| JP | 11-85319 | 3/1999 |
| KR | 96-11617 | 4/1996 |
| KR | 006055 | 1/1997 |
| KR | 027408 | 7/1998 |
| KR | 1998-041727 | 8/1998 |
| KR | 026831 | 8/1998 |
| KR | 2003-0080125 | 10/2003 |
| KR | 2003-0080126 | 10/2003 |
| WO | WO 90/10924 | 9/1990 |
| WO | WO 90/15359 | 12/1990 |
| WO | WO 96/27147 | 9/1996 |

OTHER PUBLICATIONS

Korean Office Action dated Jan. 31, 2001 (with English translation).
Japanese Office Action dated Feb. 13, 2002 (with English translation).
Great Britain Office Action dated May 31, 2000.
IBM Monitor Photographs (1996), 21 pages.
VTech Powerpad Photographs (1993), 9 pages.
Sony 14.1"Notebook PC, 6 pp.
IBM Monitor, Model #9516, 13 pp.
Pixel Vision SGT15P, 9 pp.
IBM Monitor, Model # 39H7116, 7 pp.
View Sonic Corporation Monitor, Model # VPA138, 6 pp.
View Sonic Corporation Monitor, Model # VP140, 5 pp.
Cockpit Displays III (SPIE- The International Society for Optical Engineering) vol. 2734, 12 pp.
IBM Electronic Pocket Reference Manual for the IBM 9516-A03 Monitor, 29 pp.
Murata et al., *10.4-inch TFT Liquid Crystal Display for Sub-Note Type Personal Computers*, National Technical Report, Dec. 1997, vol. 43, Issue 6, pp. 56-61, w/English Abstract.
PixelVision SGT 115, five (9) pages.
Viewsonic 140, five (5) pages.
Dell Inspiron 3000 Series Service Manual, Jul. 1998.
Momenta Corporation Display Schematic, Dec. 1990.
First Set of Photographs of PixelVision Model No. S6T15P, Date Unknown.
Second Set of Photographs of PixelVision Model No. S6T15P, Date Unknown.
Brochure for PixelVision SmartGlas Display System, 1997.
Photographs of PixelVision SmartGlas Display System, Mar. 1998.
First Set of Photographs of Tatung Model No. L4KAS, Date Unknown.

Second Set of Photographs of Tatung Model No. L4KAS, Date Unknown.
Apple Macintosh Powerbook 190/5300 Series Service Guide, 1996.
Hewlett Packard Omnibook 4100 Service Manual, Apr. 1998.
Viewsonic Corporation's Motion to File Surreply to LG.Philips' Reply Brief in Support of Motion for Preliminary Injunction, Mar. 1, 2005.
Answer, Counterclaims and Damand for Jury Trial of Defendant Tatung Company of America, Apr. 19, 2005.
Answer, Counterclaims and Demand for Jury Trial of Defendant Tatung Co., Apr. 19, 2005.
Combined Initial Disclosures of Defendant Tatung Company of America and Tatung Company, Jul. 29, 2005.
Defendant Viewsonic Corporation's Further Responses to Plaintiff's First Set of Interrogatories, Dec. 6, 2004.
Declaration of David E. Moore In Support of the Defendant ViewSonic Corporation's Opposition to Plaintiffs's Motion for Preliminary Injunction (D.I. 64), Dec. 6, 2004.
Answer and Defenses of Defendant Viewsonic Corporation, Jun. 30, 2004.
Viewsonic Corporation's Surreply to LG.Philips' Reply Brief in Support of Motion for Preliminary Injunction dated Mar. 1, 2005.
Declaration of David E. Moore In Support of Defendant Viewsonic Corporation's Opposition to Plaintiff's Motion for Preliminary Injunction (D.I.64) filed Sep. 10, 2004.
TFT Color LCD Module Data Sheet for NEC NL3224AC35-01, (20 pp),dated May 1996.
Device Specification for TFT-LCD Module, Model No. Sharp LQ5AW116, dated Jun. 30, 1997.
Device Specification for TFT-LCD Module, Model No. Sharp LQRA35, dated Jul. 31, 1993.
Device Specification for TFT-LCD Module, Model No. Sharp LQ4RA31/32, dated May 24, 1991.
Product Specification for TFT-LCD Module, Model No. Sharp LQ5AW136, dated Jun. 15, 2001.
Device Specification for TFT-LCD Module, Model No. Sharp LQ6RA52, dated Jan. 27, 1994.
Device Specification for TFT-LCD Module, Model No. Sharp LQ6RA01/02, dated May 29, 1990.
Device Specification for TFT-LCD Module, Model No. Sharp LQ0B01, dated Jul. 31, 1992.
Matsushita Model MD480T640PG4 Monitor Photographs (2 pp).
Matsushita Model MD480T640PG3 Monitor Photographs (2 pp).
PixelVision Model SGTI8QX Monitor Photographs (11 pp).
Eizo Model FlexScan L23 Monitor Photographs (8 pp).
Device Specification for TFT-LCD Module, Model No. Sharp LQ4NC31, Sharp LQ4NC32, dated May 31, 1991.
Device Specification for TFT-LCD Module, Model No. Sharp LQ4RB15, dated Aug. 20, 1992.
Device Specification for TFT-LCD Module, Model No. Sharp LQ4RB17, dated Jun. 24, 1993.
Techhical Literature for Sharp LQ6MC01 Sharp LQ6MC02, dated Jun. 12, 1990.
VESA Flat Panel Monitor Physical Mounting Interface Standard, Version release date Nov. 13, 1997.
Panasonic Model CF-270 Monitor Service Manual.
ViewSonic (Optiquest) Model L700 Monitor Photographs (26 pp).
Optiquest Model L700 Monitor Brochure, copyright year 1998, 2pp.
ViewSonic Model VP150 Monitor Photographs (26 pp).
ViewSonic Model VP150 Monitor ViewPanel brochure, copyright year 1999.
An 11.8-in. Flat Panel Monitor, by Hodge, et al. Hewlette Packard Journal pp. 51-60, Aug. 1995.
IBM Mobile Systems Hardware Maintenance Manual 490pp, May 1995.
Preliminary Product Specification for LP141X3 Liquid Crystal Display, LG Electronics, dated Feb. 5, 1998. pp. 1-19.
Preliminary Product Specification for LM151X2-C2TH Liquid Crystal Display, LG Electronics, dated Nov. 25, 1998. pp. 1-22.
Product Specification for LM151X2 Liquid Crystal Display, LG Philips LCD, dated Oct. 14, 1998. pp. 1-25.
Preliminary Product Specification for LM151X3-A2 Liquid Crystal Display, LG Philips LCD, dated Jan. 19. 2000 pp. 1-26.
Product Specification for LM151X4-A3 Liquid Crystal Display, LG Philips LCD, dated Nov. 29, 2001 pp. 1-25.
Preliminary Specification for LM157E1-A2 Liquid Crystal Display, LG Philips LCD, dated May 11, 2000 pp. 1-24.
Preliminary Specification for LM150X1 Liquid Crystal Display, LG Philips LCD, dated Apr. 1, 1999 pp. 1-20.
Product Specification for LP150X05-A2C1 Liquid Crystal Display, LG Philips LCD, dated May 7, 2002, pp. 1-26.
IBM Press Release downloaded from http://www.-03.ibm.com/press/us/en/pressrelease/2749.wss; dated Aug. 1, 2007; IBM Expands Flat Panel Display Line, Reduces Pricing (2 pgs.).
NEC Model NL3224AC35-01 Liquid Crystal Display Photographs, 20 pp.
Sharp Model LQ6RA01 Liquid Crystal Display Device Photographs, 31 pp.
LG Model 500 LC LCD Display Photographs, 19 pp.
Goldstar Model LC056N1 LCD Display Photographs, 27 pp.
Sharp Model LQ6NC02, Liquid Crystal Display Photographs, 18 pp.
Sharp Model LQ5AW116 Liquid Crystal Display Photographs, 24 pp.
Sharp Model LQ4RA32 Liquid Crystal Display Photographs, 13 pp.
Sharp Model LQ4RA35 Liquid Crystal Display Photographs, 15 pp.
PixelVision Monitor, Model SGT15P Photographs, 16 pp.
LG Model 500LC Liquid Crystal Display User Guide, 36 pp.
LG 500LC Liquid Crystal Display Specification, 51 pp.
IBM Hardware Maintenance Manual, vol. 4; Thinkpad Computers, Sep. 1997, 715 pp.
Hewlett Packard Model A288A Monitor Photographs, 15 pp.
Special Master Opinion and Order On Claim Construction, dated Jun. 15, 2007 & Appendix A. (35 pgs.).
Plaintiff LG.Philips LCD Co., Ltd.'s Exceptions To The Special Master's Report and Recommendations On Claim Construction, dated Jul. 6, 2007, including Cert. of Service. (17 pgs.).
Defendant Viewsonic Corporation's Objections To The Special Master's Report and Recommendation Regarding Claim Construction, dated Jul. 6, 2007, including Cert. of Service. (28 pgs.).
Declaration Of James D. Heisman In Support Of Defendant Viewsonic Corporation's Exceptions To The Special Master's Report and Recommendation Regarding Claim Construction, dated Jul. 6, 2007, including Cert. of Service and Exhs. 27-31. (239 pgs.).
Joint Submission Of Claim Terms, Proposed Constructions and Citations To Intrinsic Evidence-Filed Pursuant to Scheduling Order, dated Nov. 16, 2006, attaching Schedule A and Cert. of Service. (82 pgs.).
Corrected Defendants Tatung Company's and Tatung Company Of America, Inc.'s Opening Claim Construction Brief, dated Dec. 28, 2006; attaching TA1-TA5. (192 pgs.).
Defendant Viewsonic Corporation's Corrected Opening Claim Construction Brief, dated Dec. 26, 2007 attaching Exhs. 1-3 and including Cert. of Service. (52 pgs.).
Plaintiff LG.Philip's LCD Co., Ltd.'s Opening Claim Construction Brief, dated Dec. 22, 2006 and Cert. of Service. (41 pgs).
Appendix Of Exhibits To LG.Philip's LCD Co., Ltd.'s Opening Claim Construction Brief, dated Dec. 22, 2006, attaching LPL1-LPL9 and Cert. of Service. (40 pgs.).
Defendants Tatung Company's and Tatung Company of America, Inc.'s Supplemental Opening Claim Construction Brief, dated Apr. 30, 2007 attaching Exhs. A, B and Cert. of Service. (32 pgs.).
Plaintiffs Supplemental Claim Construction Memorandum In Support Of Two New Claim Terms; dated Apr. 30, 2007. (22 pgs.).
Defendant Viewsonic Corporation's Supplemental Opening Claim Construction Brief, dated Apr. 30, 2007, attaching Exhs. 4 & 5, including Cert. of Service. (53 pgs.).
Schedule A, Document 636-2, filed Apr. 23, 2007. (50 pgs.).
Defendant Tatung Company Of America's, Inc.'s Fifth Set of Supplemental Responses To Plaintiff's Second Set Of Interrogatories, dated Jul. 16, 2007. (6 pgs.).
Defendant Tatung Company Of America's, Inc.'s Third Set of Supplemental Responses to Plaintiff's Second Set Of Interrogatories, dated Mar. 30, 2007. (172 pgs.).
Defendant Tatung Company Of America, Inc.'s Fourth Set of Supplemental Responses to Plaintiff's Second Set of Interrogatories, dated Jun. 8, 2007. (14 pgs.).

Defendant Tatung Company's Second Set of Supplemental Responses to Plaintiff's Second Set Of Interrogatories, dated Mar. 30, 2007. (114 pgs.).

Defendant Tatung Company's Third Set of Supplemental Responses to Plaintiff's Second Set Of Interrogatories, dated Jun. 8, 2007. (13 pgs.).

Defendant Tatung Company's Fourth Set of Supplemental Responses to Plaintiff's Second Set Of Interrogatories, dated Jul. 16, 2007, attaching Exh. A and Proof of Service. (118 pgs.).

Defendant Viewsonic Corporation's Third Supplemental Responses to Plaintiff's Second Set Of Interrogatories, dated Jun. 8, 2007. (pp. 1-8 and pp. 815-901).

Defendant Viewsonic Corporation's Fourth Supplemental Responses To Interrogatory No. 8 Contained in Plaintiff's Second Set of Interrogatories, dated Jul. 16, 2007. (472 pgs.).

"Nikkei Microdevice Special Issue Flat Panel Display 1997", Dec. 12, 1996 at p. 49.

Appln for McCartney, Richard, et al; The Primary Flight Instruments for the Boeing 777 Airplane; SPIE Vo. 2219 Cockpit Display; 1994; 13 pgs.

Appln for Smith-Gillespie, Robert D., et al; 777 LCD Backlight Life; SPIE Vo. 2219 Cockpit Display; 1994; 9 pgs.

Appln for Wood, Ted; Honeywell Militarized Color Liquid Crystal Displays for the F-16; SPIE Vo. 2734; 1994; 12 pgs.

Kawamoto, Masahiro, et al; Color-Liquid-Crystal Display for Automotive Instrument Panel (English Trnsltn included); 14 pgs.

Prosecution History of European Patent No. 0880049; 184 pgs.

Prosecution History of European Patent No. 297 12775; 53 pgs.

Prosecution History of European Patent No. 297 21 272.9; 45 pgs.

Prosecution History of European Patent No. 2 319 110; 124 pgs.

Prosecution History of European Patent No. 2 761 798; 22 pgs.

Prosecution History of European Patent No. 197 3 006; 44 pgs.

Prosecution History of European Patent No. 0 880 049; 53 pgs.

Prosecution History of European Patent No. 00115576; 32 pgs.

Prosecution History of Singapore Patent No. 9800814-7; 52 pgs.

English language translation dated Apr. 9, 1999 of attachment to Japanese Patent Appln. H09-135610, (17 pgs.).

* cited by examiner

PORTABLE COMPUTER AND METHOD FOR MOUNTING A FLAT PANEL DISPLAY DEVICE THEREON

This application is a divisional of application Ser. No. 10/294,548 filed Nov. 15, 2002, now abandoned, which is a continuation of application Ser. No. 09/285,338 filed Apr. 2, 1999, now U.S. Pat. No. 6,501,641, all of which are hereby incorporated by reference as if fully set forth herein.

This application claims the benefit of Korean Patent Application Nos. 98-44475, filed on Oct. 23, 1998 and 98-44973, filed on Oct. 27, 1998, which are hereby incorporated by reference.

BACKGROUND OF THE INVENTION

1. Field of the Invention

The present invention relates generally to a flat panel display device, and more specifically, to a flat panel display device mounting structure and a method of mounting the flat panel display device to a computer.

2. Description of the Related Art

Flat panel display devices include liquid crystal display devices (LCD) which are being used widely, plasma display panels (PDP), and field emission displays (FED) which have been studied recently and may be applied to computers in the near future. For convenience of explanation, the present invention will be discussed with respect to the LCD as an example of the flat screen type display devices and a portable computer mounted with the LCD.

Referring to FIG. 1, a general portable computer such as a laptop or notebook computer typically includes a body 100, a flat panel display device assembly 110 coupled to the body 100 via a hinge mechanism 124. The flat panel type display device assembly 110 has a flat panel display device 111 and a display case 122 supporting the device 111. The body 100 has an input device 102 such as a keyboard. As a flat panel type display device 111, the LCD is widely used in portable computers and flat screen monitors.

Referring to FIG. 2 which shows conventional assembly structure of the LCD device applied to a conventional portable computer, the display case 122 has a rear case 123 and a front case or frame 121 for mounting the LCD device module 130. The rear case or frame 123 has an outer surface and an inner surface and connecting ribs 123a are formed at the corners.

The LCD device 130 has an LCD panel 132, a backlight device 134 fixed to the back of the LCD panel 132, and a supporting frame 136 for assembling the panel 132 and the backlight device 134 along the edge.

At the corners of the supporting frame 136, corresponding to the positions of the ribs 123a of the rear case 123, a plurality of protrusions 136a having holes are formed.

For mounting the LCD device 130 to the case 122, the LCD device 130 is placed on the rear case 123 and the holes of the supporting frame 136 and the ribs 123a are fastened together preferably by screws 138. The front case 121 is coupled to the rear case 123.

Hereinafter, the way in which the LCD device is mounted to the case from the front toward the rear direction is defined as the front mounting method, and the assembled structure of the LCD device and the case formed through the front mounting method is defined as the front mounting structure.

In the front mounting structure of the LCD device, since the protrusions 136a require additional space corresponding to the protruded width d, the display area of the LCD device is reduced in comparison to the fixed size of the case 122.

The front mounting structure may also include an additional feature to further support the LCD panel, as shown in FIGS. 3A and 3B.

Referring to FIGS. 3A and 3B, a conventional LCD device assembly 110 includes an LCD panel 112 and a backlight device (not shown) for the LCD panel, and display case 122 supporting the LCD device 111. The LCD panel 112 and the backlight device are assembled by a supporting frame 114 along the edges.

The display case 122 is coupled to a body 120 via a hinge mechanism 124, which may extend from the body 120. The display case 122 and the hinge mechanism 124 are assembled through a hinge arm 126, allowing the display device assembly 110 to pivotally move with respect to the body 120.

Two opposite sides of the supporting frame 114 include flanges 114a for assembling the LCD device 111 to the display case 122, and corners include flanges 114b for assembling the LCD device 111 to the hinge arm 126. Hereinafter, the former is referred as a fixing flange and the latter is referred as a mounting flange in this specification for distinction purposes. As shown in FIG. 3B, the fixing flanges 114a have a protruding width d2 and the mounting flanges 114b have a protruding width d1. A screw hole is formed in each of the flanges 114a and 114b. On the inner surface of the display case 122, ribs 122a are formed corresponding to the holes of the fixing flange 114a.

To mount the LCD device 111, the hinge arm 126 and the mounting flanges 114b are screwed together, and the fixing flanges 114a and the ribs 122a are screwed together by bolts 128.

In the mounting structure shown in FIG. 3B, the supporting frame 114 requires side spaces for the flanges 114a and 114b. Therefore, the side space D (d1+d2) results in a reduction of the display area of the LCD panel 112 relative to the display case 122. Moreover, as the display size increases, the display case becomes undesirably large, especially for a portable computer such as a laptop computer.

To solve the above problem and to provide a large display area with minimal display case size, a new mounting structure is needed for the LCD device.

SUMMARY OF THE INVENTION

Accordingly, the present invention is directed to a portable computer and method for mounting a flat panel display device thereon that substantially obviates one or more of the problems due to limitations and disadvantages of the related art.

An object of the present invention is to minimize the non-display area of the LCD device.

Another object of the present invention is to provide a computer having a flat panel display with a maximum display area and a minimal display case size.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a portable computer includes a body having an information input device; a case coupled to the body and having inner and outer surfaces; and a flat panel display device having a display surface and a rear surface, the rear surface being fixed to the inner surface of the case.

According to another aspect of the present invention, a portable computer includes a body having an information input device; a flat panel display case coupled to the body; a flat panel display device having a display surface and a rear surface; and a hinge mechanism having a hinge mount and a hinge arm fixed to the rear surface of the display device.

According to another aspect of the present invention, a method of mounting a flat panel display device to a hinge mechanism having a hinge mount, a hinge arm, and a pin portion rotating in the hinge mount, the flat panel display device having a display surface and a rear surface, the method including a step of fixing the rear surface of the flat panel display device to the hinge arm. The fixing step is preferably carried out by attaching the hinge arm and the rear surface of the flat display device using a screw.

According to a further aspect of the present invention, an LCD device coupled to an outer case includes an LCD panel having a display surface and a rear surface; a backlight device having a first surface facing the rear surface of the LCD panel and a second surface attached to the outer case; and a supporting frame for assembling the LCD panel and the backlight device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, an example of which is illustrated in the accompanying drawings.

The present invention provides a back mounting method and a back mounting structure for a display panel device in a portable computer. Moreover, the rear surface of the display panel device may be coupled to a hinge arm for further support of the display panel device.

Figure 4A:
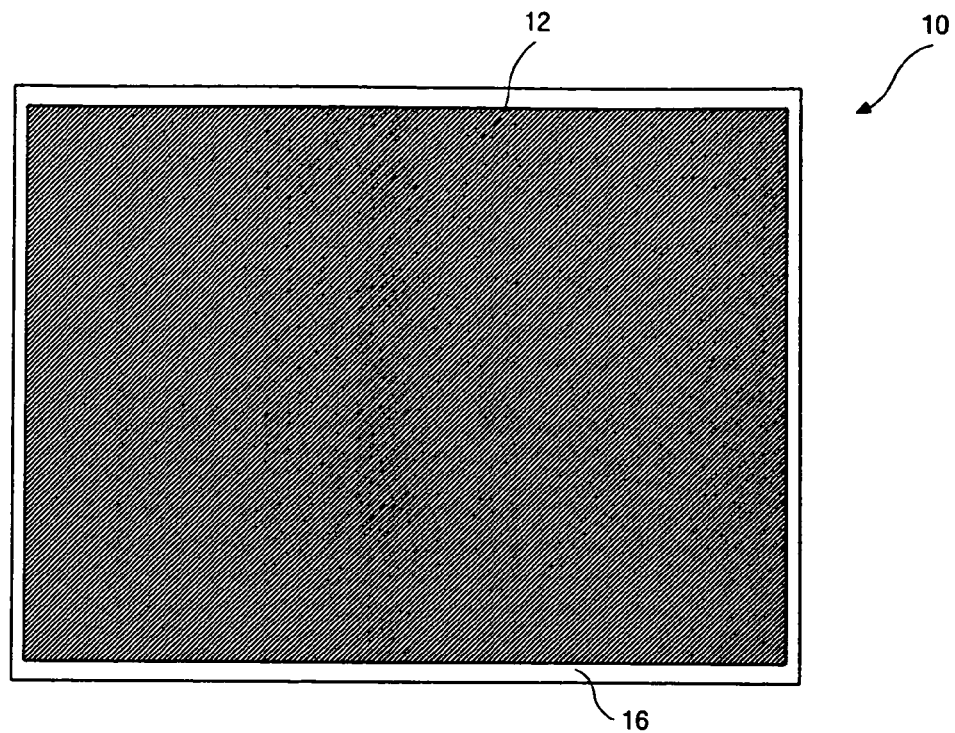
FIGS. 4A-4C show the LCD device according to a first embodiment of the present invention.
Figure 4B:
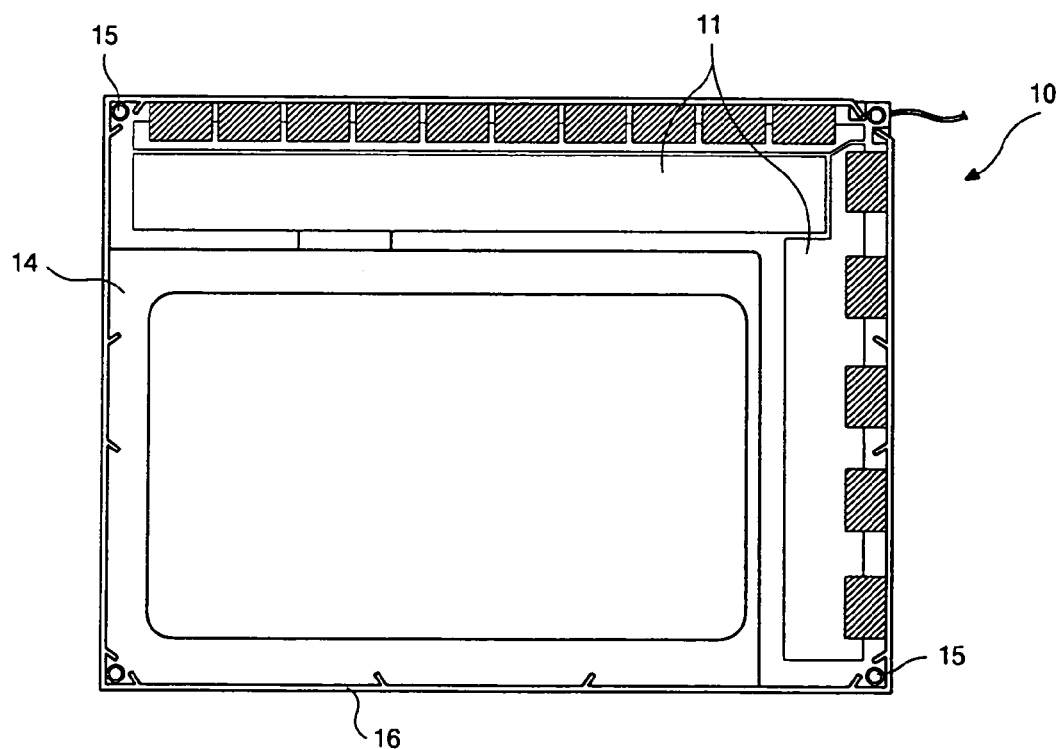
Figure 4C:
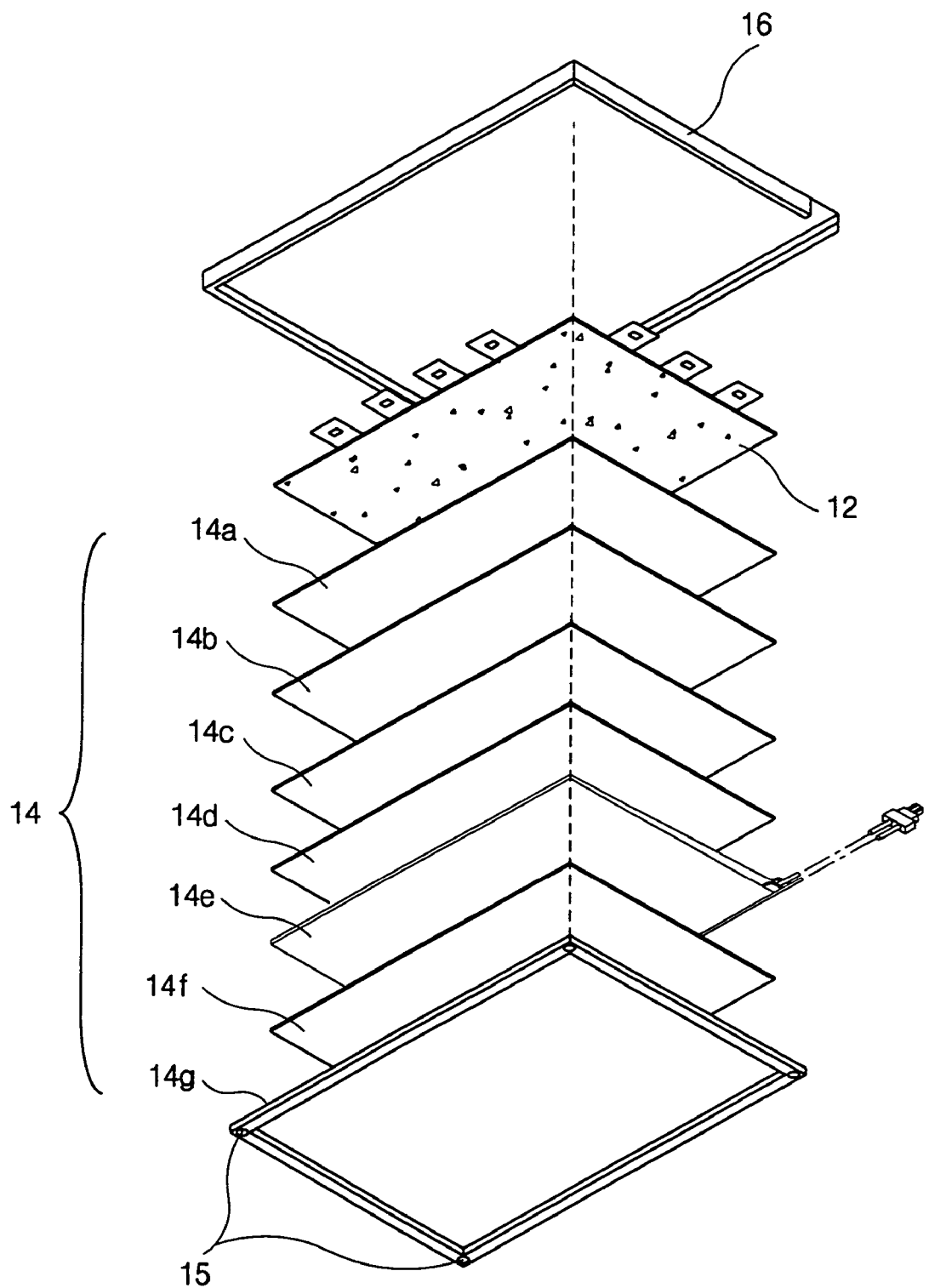

FIGS. 4A-4C show a second embodiment of the present invention. Referring to FIGS. 4A and 4B, the LCD device 10 has an LCD panel 12, a backlight unit 14, and a supporting frame 16. FIG. 4C shows an example of a detailed structure of the LCD device shown in FIGS. 4A and 4B. Referring to FIG. 4C, the LCD device 10 has a first frame 14g, preferably made of plastic, a reflector 14f on the frame 14g, a light guide film 14e, a diffuser or protecting film 14d, a first prism sheet 14c, a second prism sheet 14b, another diffuser or protecting film 14a, and the LCD panel 12. The first frame 14g is coupled to a second frame or supporting frame 16. At each corner of the first frame 14g a screw hole is preferably formed. Although FIG. 4C shows the first frame 14g as part of the backlight unit 14, the first frame 14g can act as the supporting frame 16.

Figure 1:
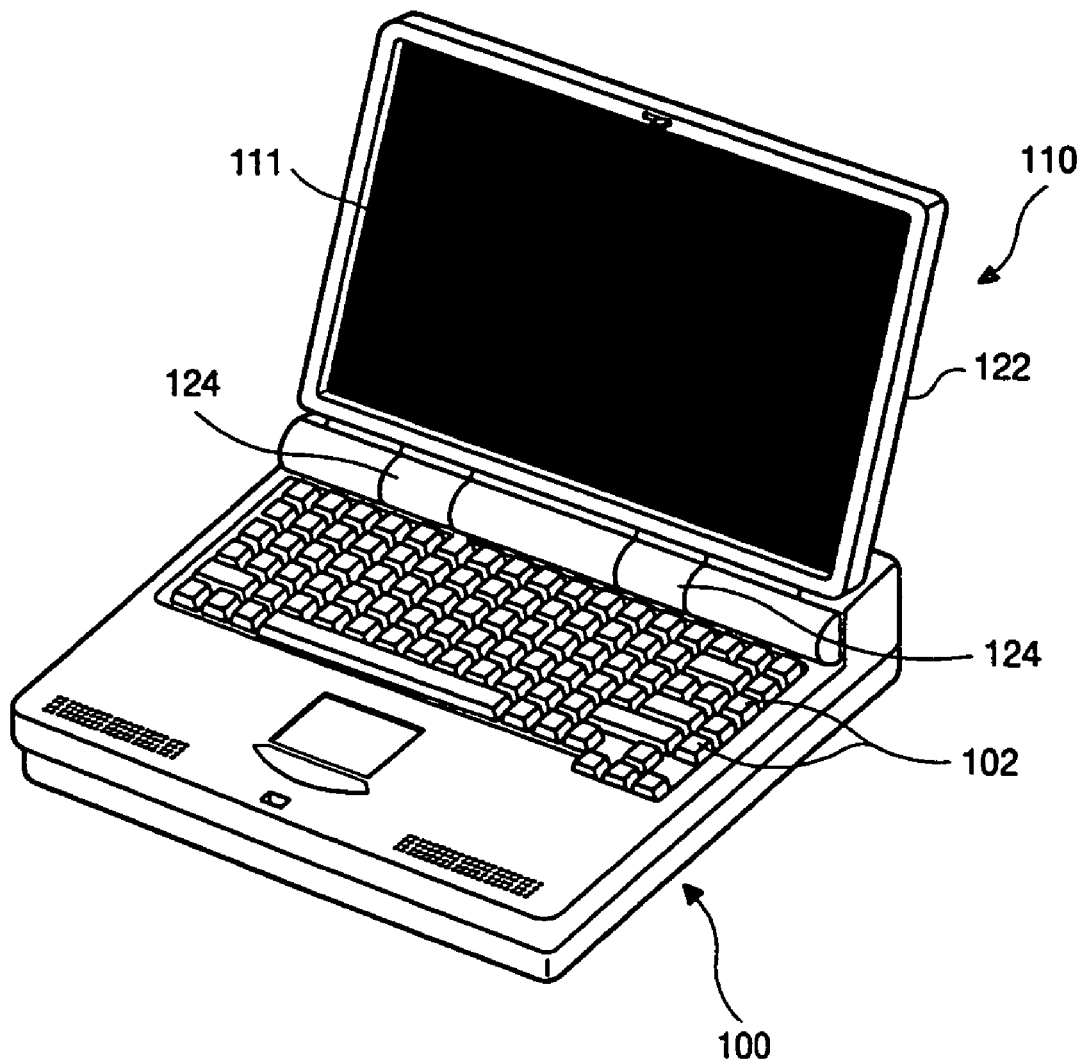
FIG. 1 is a perspective view showing a general portable computer.

To mount the LCD device 10 to the display case 122 (FIG. 1), the LCD device 10 is placed on the inner surface of the display case 122. Then, the case 122 and the LCD device 10 are attached to one another by bolts 128 into the screw hole 15 from the back of the display case 122.

Figure 3A:
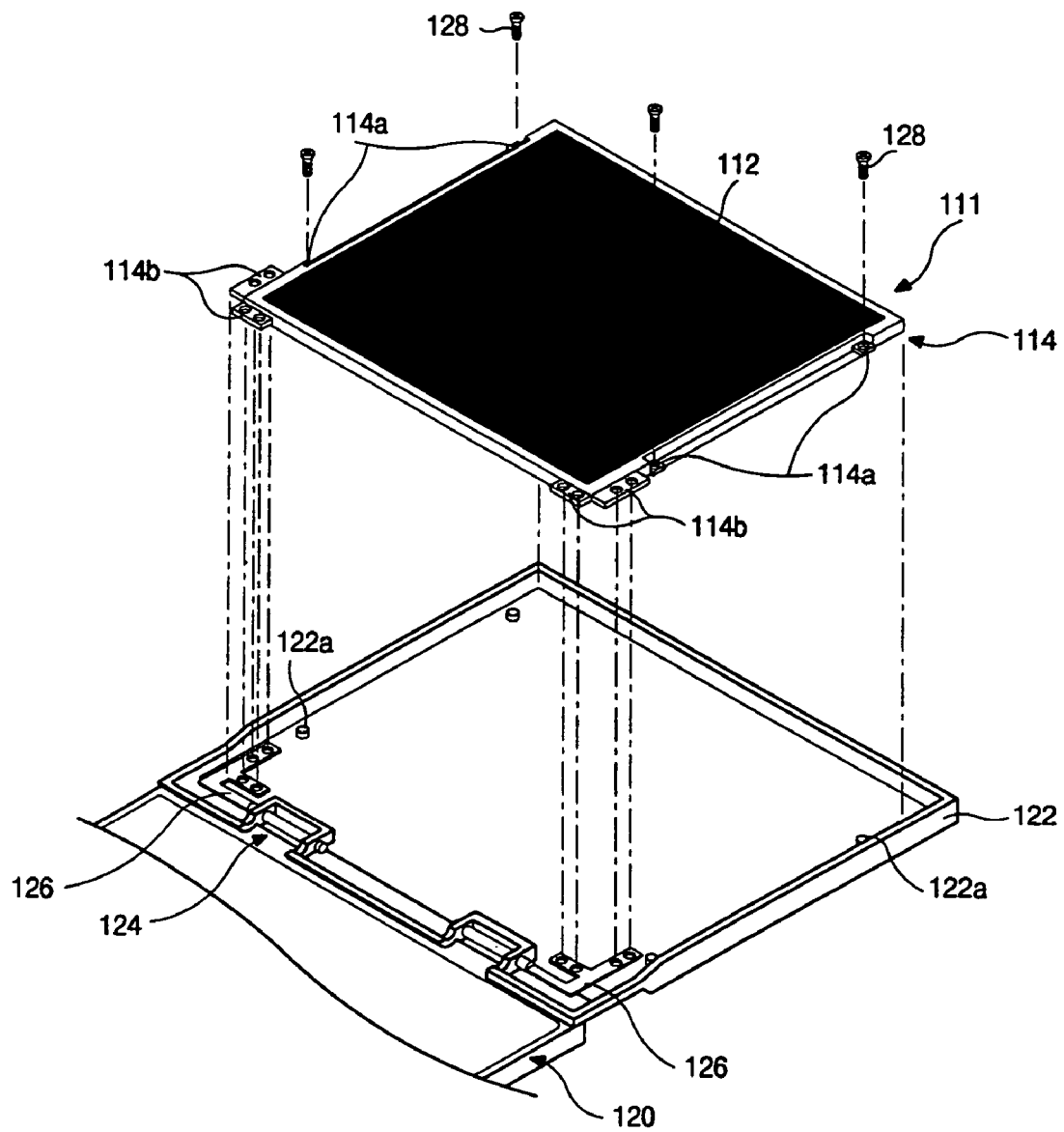
FIGS. 3A and 3B are a perspective view and a front view, respectively, showing a mounting structure of the LCD device for a portable computer.
Figure 3B:
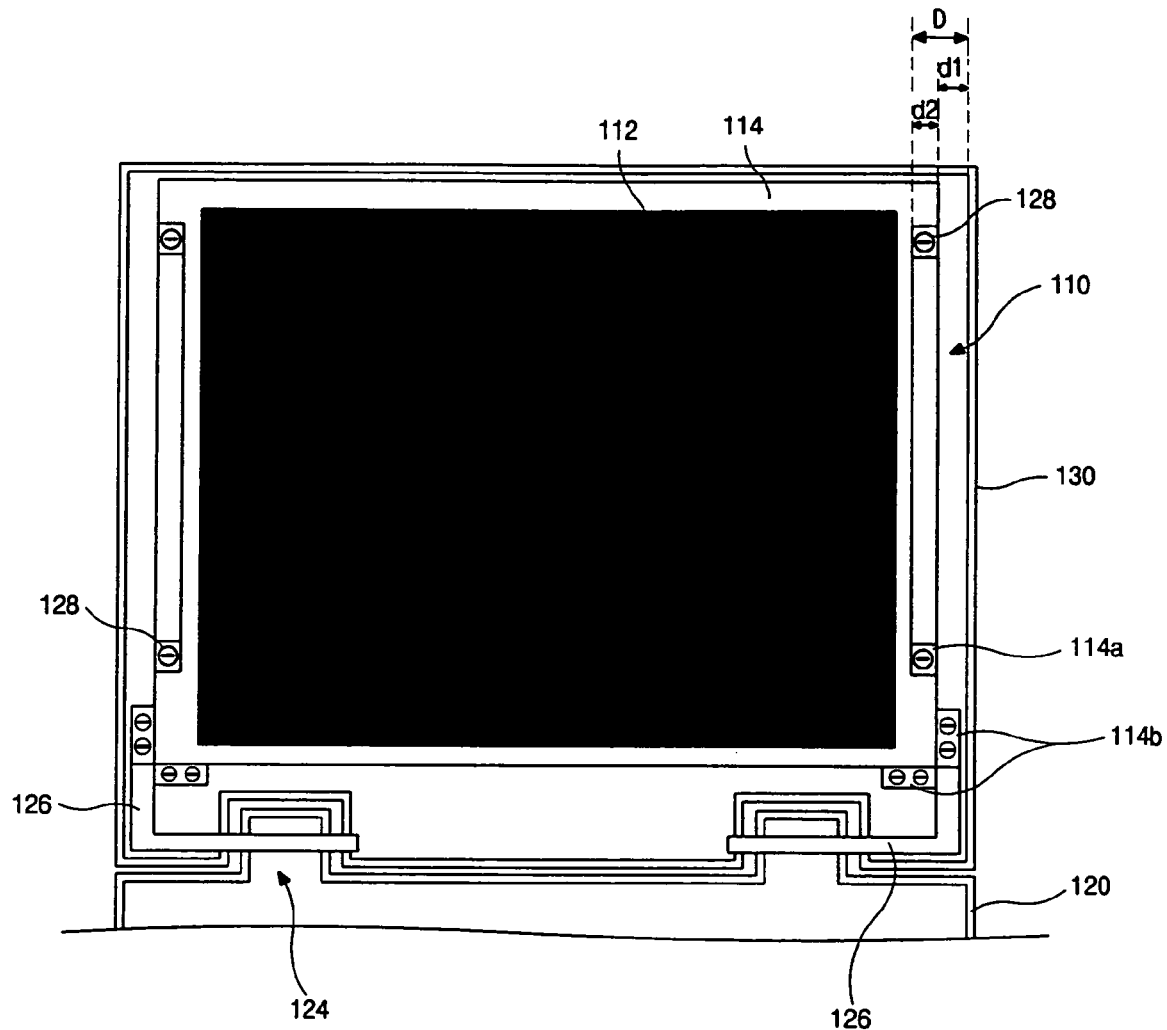

As explained above, the structure shown in FIGS. 4A-4C has an advantage in that the side space such as width d2 for fixing flange 114a of FIG. 3B is not needed and the size ratio between the display area and the display case 122 is improved.

Figure 5:
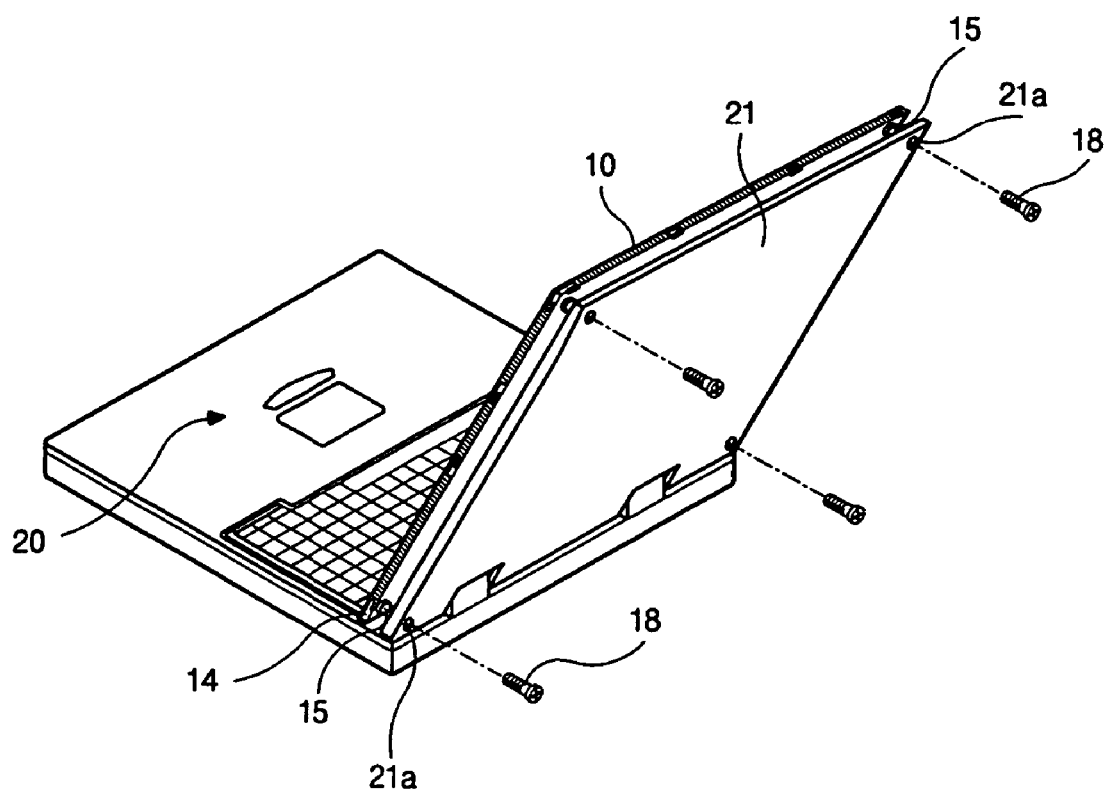
FIG. 5 shows a mounting structure in accordance with a first embodiment in accordance with the present invention.

FIG. 5 shows the assembly of the LCD device 10 to the case 21 of a portable computer according to a first embodiment of the present invention. The computer includes a body 20 having an information input device. The case 21 may cover the body 20 and is coupled to the body through a hinge mechanism. Preferably at each corner of the case 21 a through-hole 20a is formed.

To mount the LCD device 10 to the case 21, the LCD device 10 is placed on the inner surface of the case 21 such that the positions of the holes 20a and the holes 5 coincide with each other, and screws 18 are inserted into the holes 21a and 15 from the back of the case 21. The through-hole 21a is preferably stepped so that the head of the screw 18 will not protrude from the outer surface of the case 21.

Figure 2:
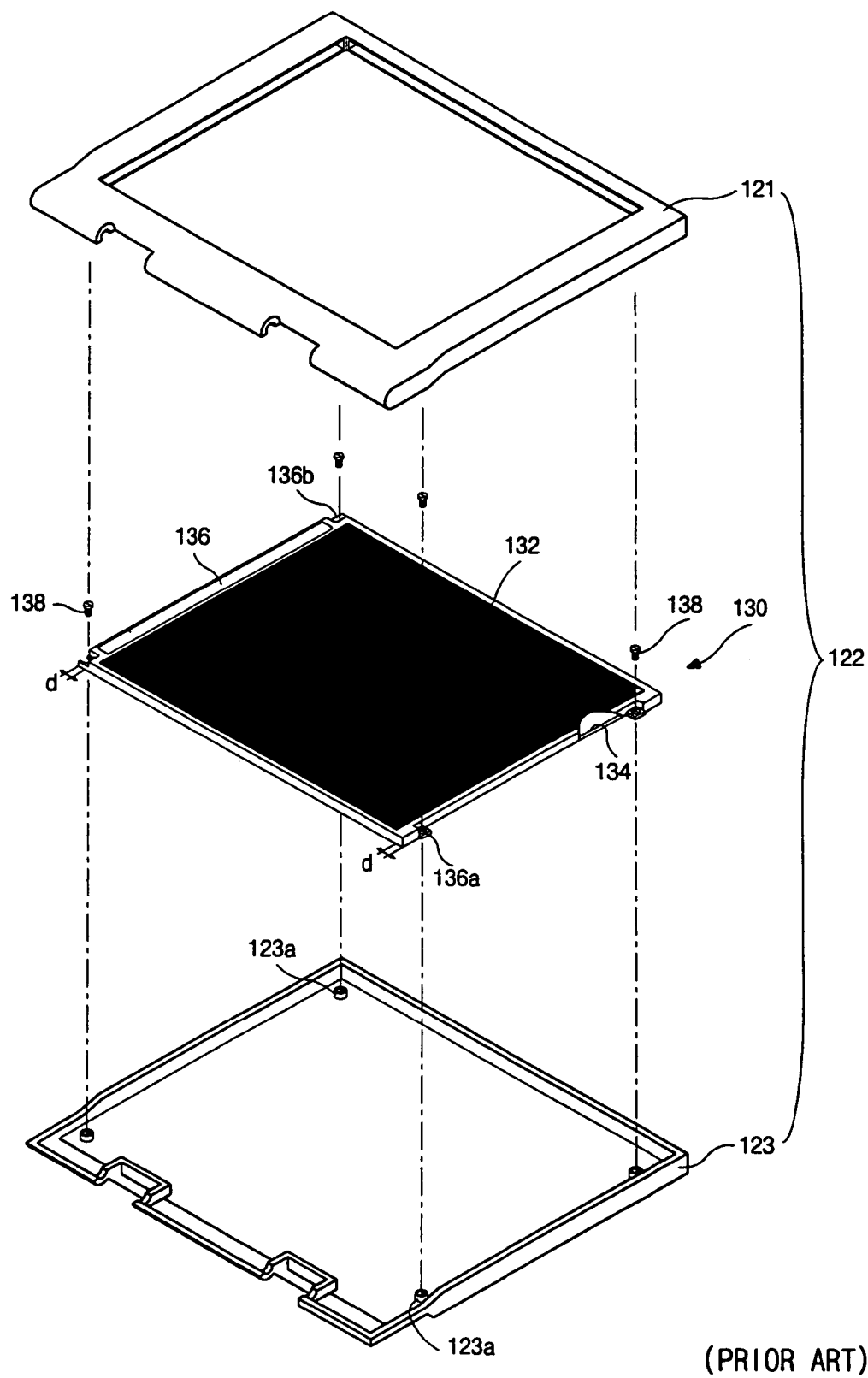
FIG. 2 shows a conventional mounting structure of the LCD device for a portable computer.

Although not shown in FIG. 5, the front case such as shown in FIG. 2 is preferably assembled with the case 21 for covering the edges of the LCD device 10.

Figure 6:
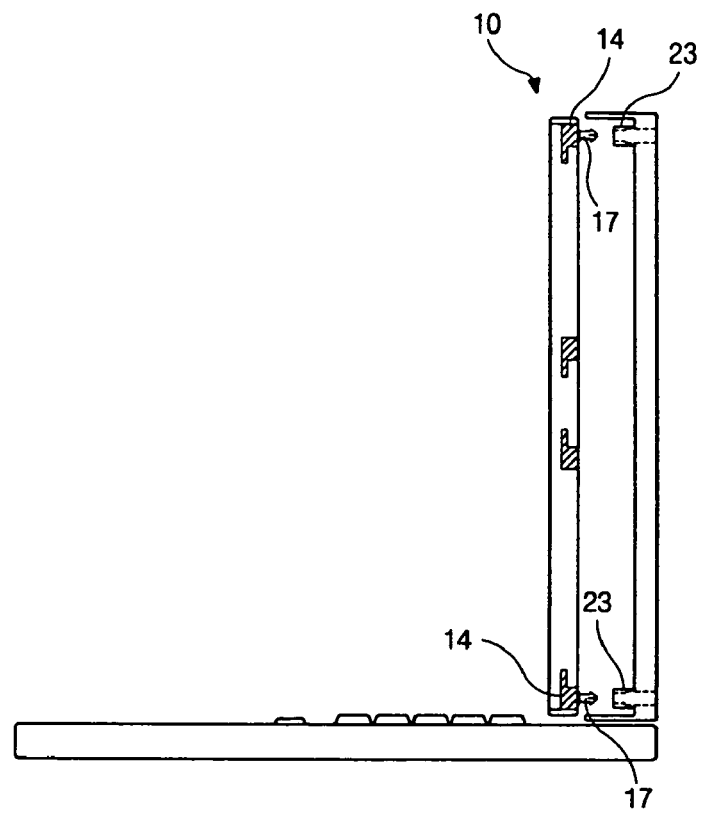
FIG. 6 shows a mounting structure in accordance with a second embodiment in accordance with the present invention.
Figure 7:
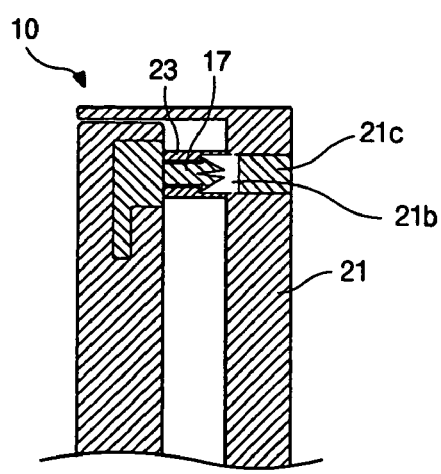
FIG. 7 is a partial sectional view showing the assembled state of the structure in FIG. 6.

FIG. 6 shows a back mounting structure of the LCD device according to a second embodiment of the present invention, and FIG. 7 is a detailed partial sectional view showing the assembled state of the LCD device 10 and the case 21 in accordance with the second embodiment.

At the rear surface of the backlight device 14 of the LCD device 10, fasteners 17 such as hooks made of plastic are formed, and the case 21 has corresponding ribs 23. Preferably, the ribs 23 do not protrude over the width of the supporting frame 16. A rib 23 has a stepped hole 21b. The fastener 17 is supported and latched by the stepped portion of the hole 21b. To facilitate the disassembly or release of the fastener 17 from the hole 21b, the hole is preferably a through-hole extending all the way to the outer surface of the case 21. The hole 21b may be covered by a cover 21c.

The fastener 17 has a compressible head which compresses into a small diameter to allow the fastener to enter and slide through the hole 21b. Once the head reaches the stepped portion, the head returns to its original diameter and snaps or latches onto the stepped portion of the rib 23. In order to dissemble or release the LCD device 10 from the case 21, a pair of tweezers or similar tool can be adapted for compressing the head of the fastener 17 from the back of the case 21 through the hole 21b. The fastener 17 is unlatched and can freely slide out of the hole 30b. As an alternative embodiment, the fastener 17 can be formed on the case 30 and the stepped hole can be formed at the rear face of the LCD device 10 to achieve similar results.

Figure 8:
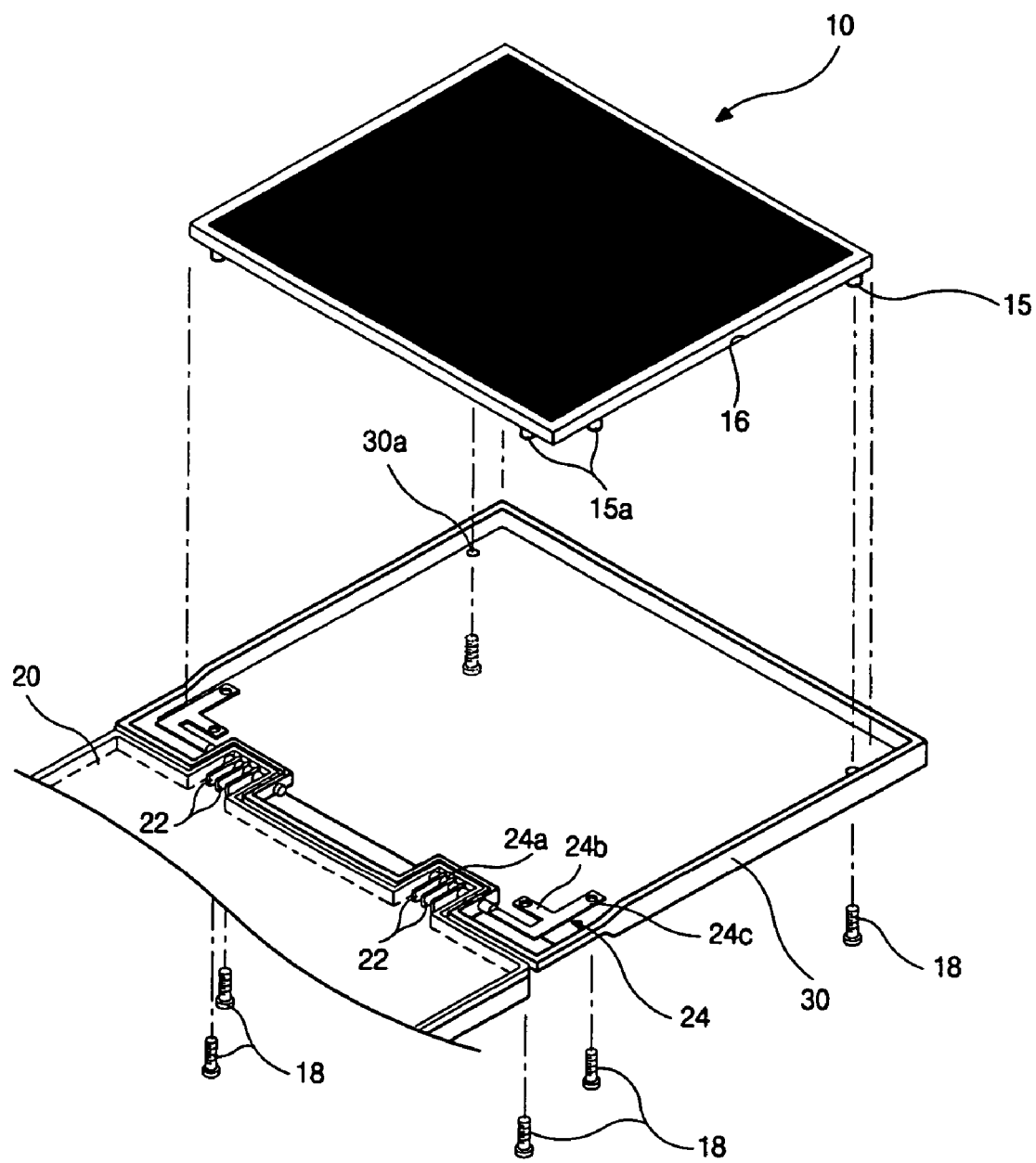
FIG. 8 is a perspective view showing a back mounting structure of the LCD device according to a third embodiment in accordance with the present invention.

FIG. 8 is a perspective view showing a mounting structure of the LCD device according to a third embodiment of the present invention. There may be one or more hinge mechanisms for the LCD device; however, for convenience of explanation, only one hinge mechanism will be explained.

Referring to FIG. 8, a body 20 includes a hinge mount 22, where a hinge arm 24 is connected. The hinge arm 24 has a pin portion 24a and a flat or extended portion 24b. The former is for being mounted to the hinge mount 22, and the latter is for being coupled to the rear surface of the LCD device 10. The various hinge components may be separate pieces of attached members or a single structure.

The flat portion 24b can be elongated in various directions and by various methods. FIG. 8 shows one example of the flat portion 24b which is in the shape of an inverted "F." At each end of the flat portion 24b, a hole such as a through-hole 24c is preferably formed. At the back surface of the LCD device 10, mounting holes 15a are formed corresponding to the positions of the through-holes 24c. The through-holes 24c are preferably screw holes. In the display case 30, a hole such as a through-hole 30a may be formed. Moreover, although hole 30a may be formed at the corresponding position of the through-hole 24c of the flat portion 24b, alternatively, the flat portion may be in an inverted "L" shape.

To mount the LCD device 10, the body 20 and the display device 30 are connected by the pin portion 24a on the hinge mount 22. The display case 30, the hinge arm 24, and the LCD device 10 are preferably attached together by screws 18 through the mounting hole 15a and the screw hole 15. Alternatively, nails or other similar known fasteners can be adopted for this purpose.

Figure 9:
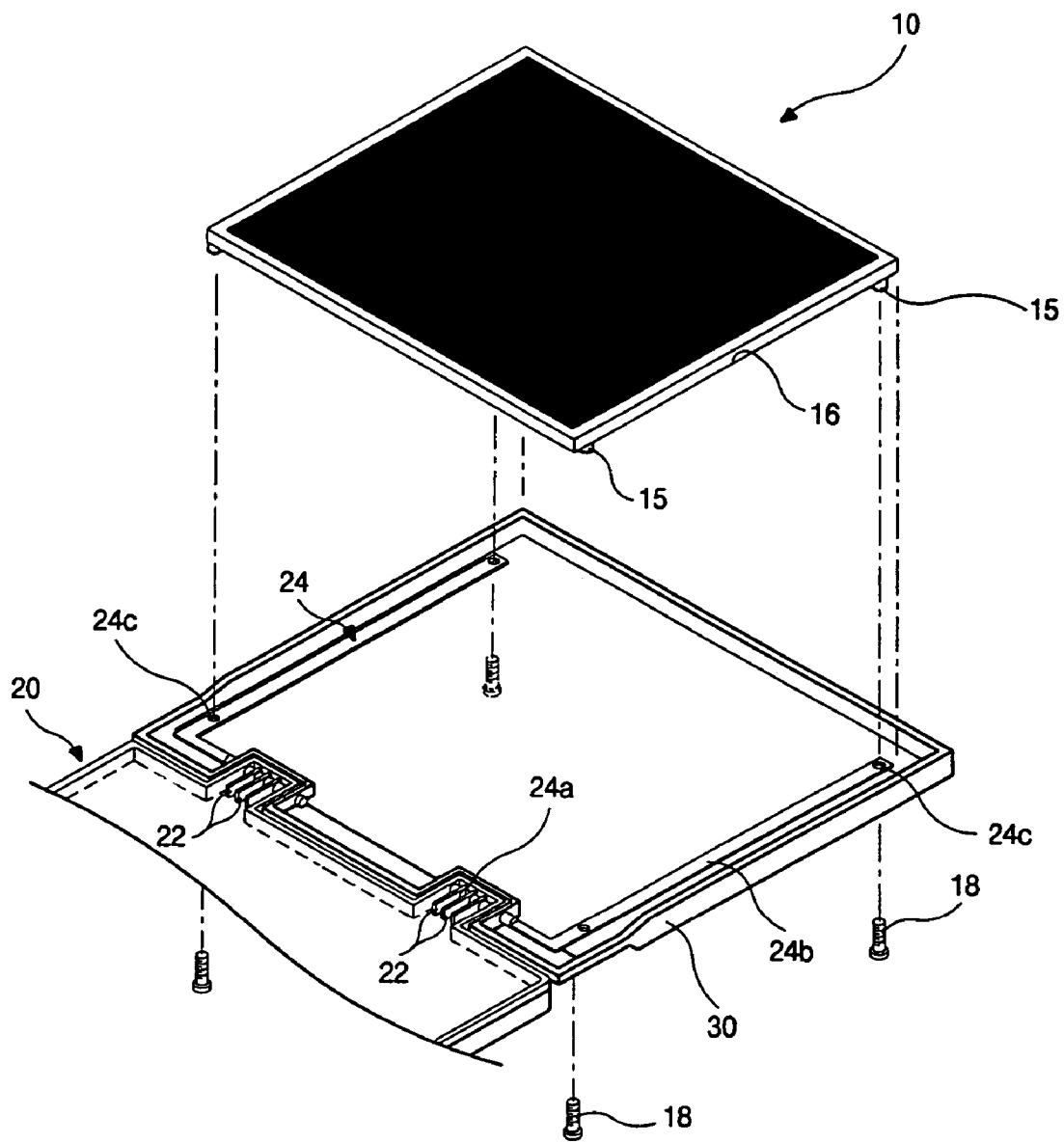
FIG. 9 is a perspective view showing a back mounting structure of the LCD device according to a fourth embodiment in accordance with the present invention.
Figure 10:
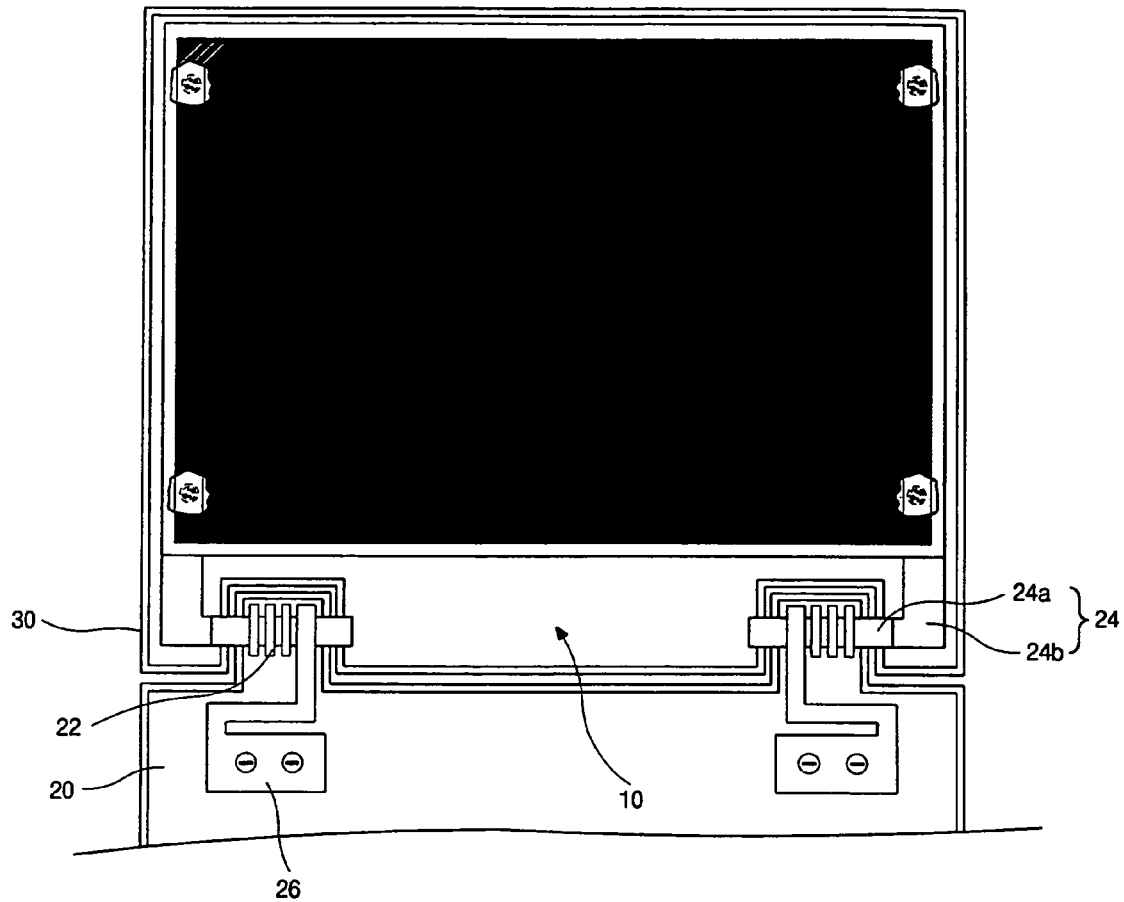
FIG. 10 is a front view showing the structure of FIG. 9.

Referring to FIGS. 9 and 10 which show a fourth embodiment of the hinge arm 24, the flat portion 24b of the hinge arm 24 is extended upwards and preferably extended to almost the entire height of the LCD device 10. In the flat portion 24b according to this embodiment, it is preferable to form a mounting hole 24c and the through-hole 30a at the same position. It is also possible to form the holes 24c and 30a at different positions relative to the display case. Thus, additional mounting hole 15a may not be necessary for this embodiment. The mounting structure of this embodiment may be stronger than that of the second embodiment. The LCD device 10, the elongated hinge arm 24, and the display case 30 are fastened together by screws 18, for example.

Figure 11:
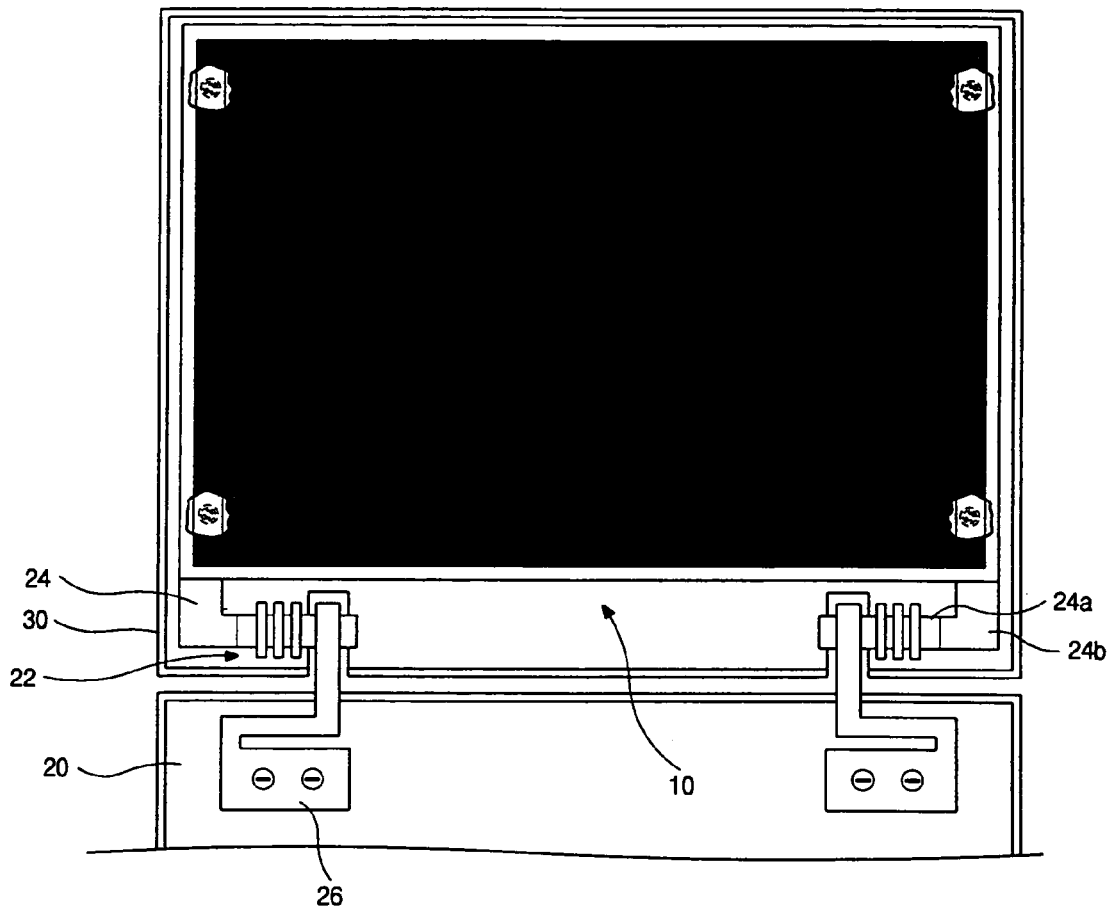
FIG. 11 is a fifth embodiment in accordance with the present invention which is an alternate embodiment to FIG. 10 where the hinge mount is fixed to the display case.

FIG. 11 shows a fifth embodiment of the present invention, where the hinge mount 22 is preferably fixed to the display case 30, but a fixed flange 26 is secured to the body 20. The structure of the hinge arm 24 and other elements are similar to those shown in FIGS. 9 and 10.

Figure 12:
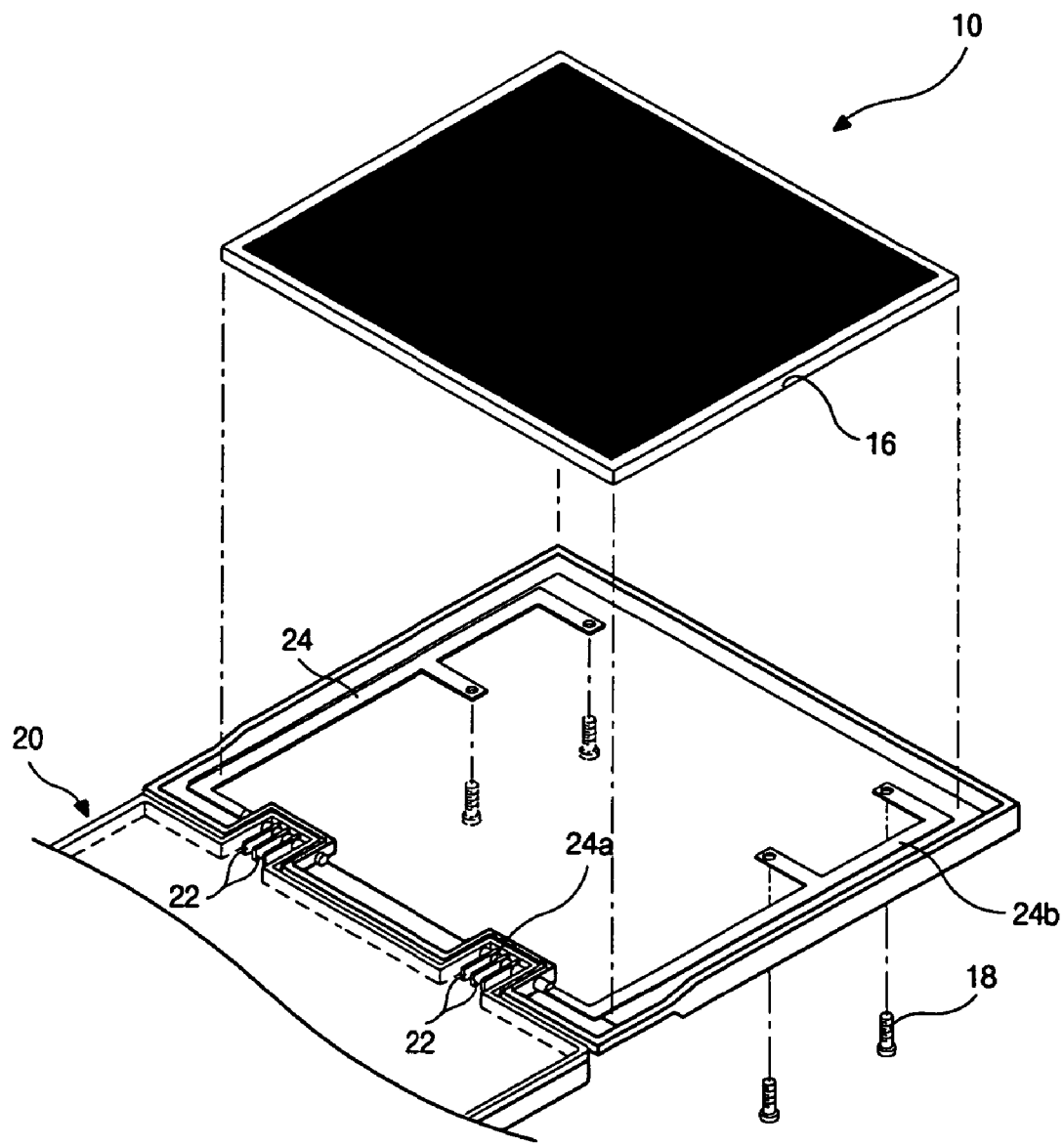
FIGS. 12, 13, and 14 are sixth; seventh, and eighth embodiments in accordance with the present invention.
Figure 13:
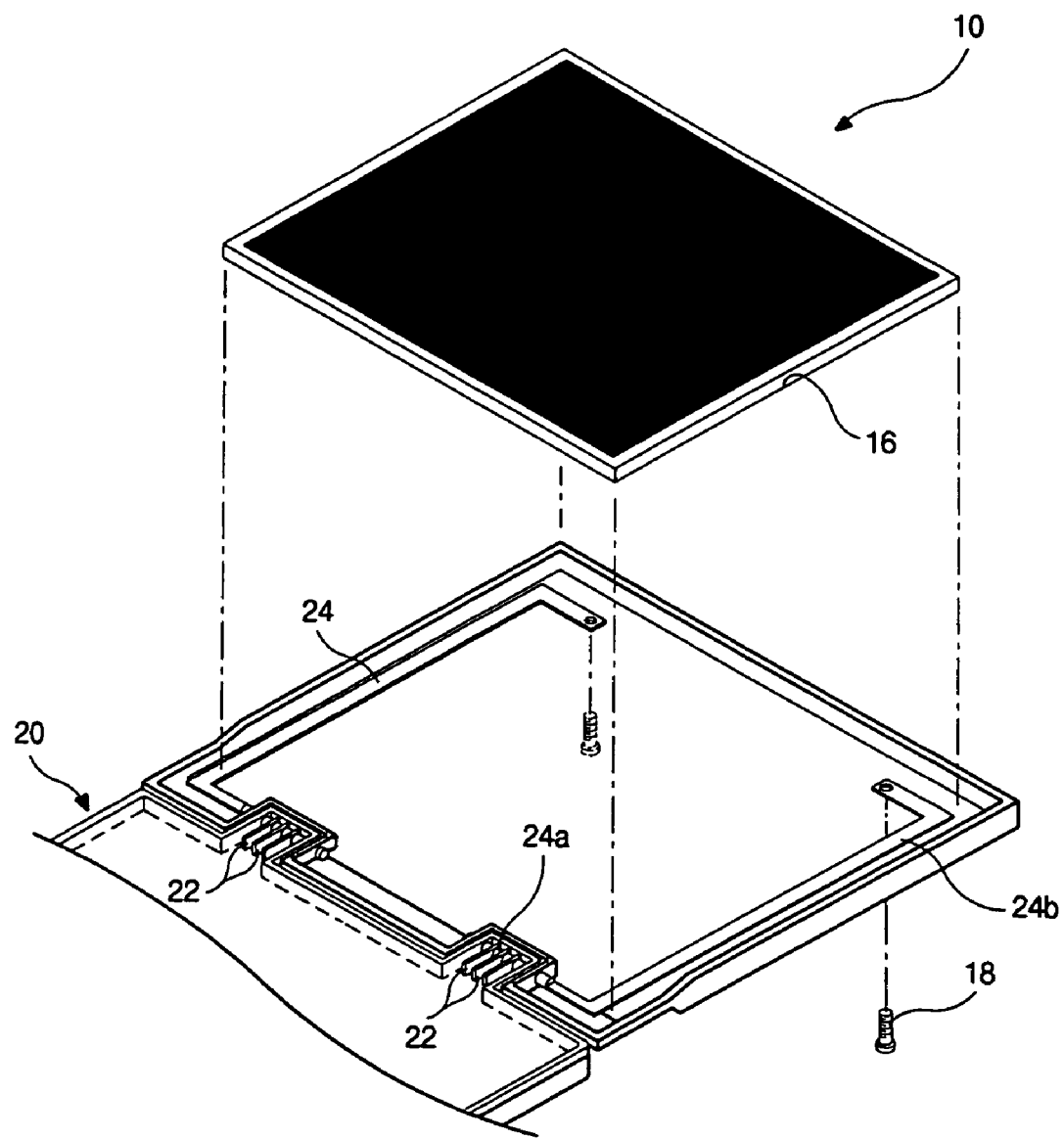
Figure 14:
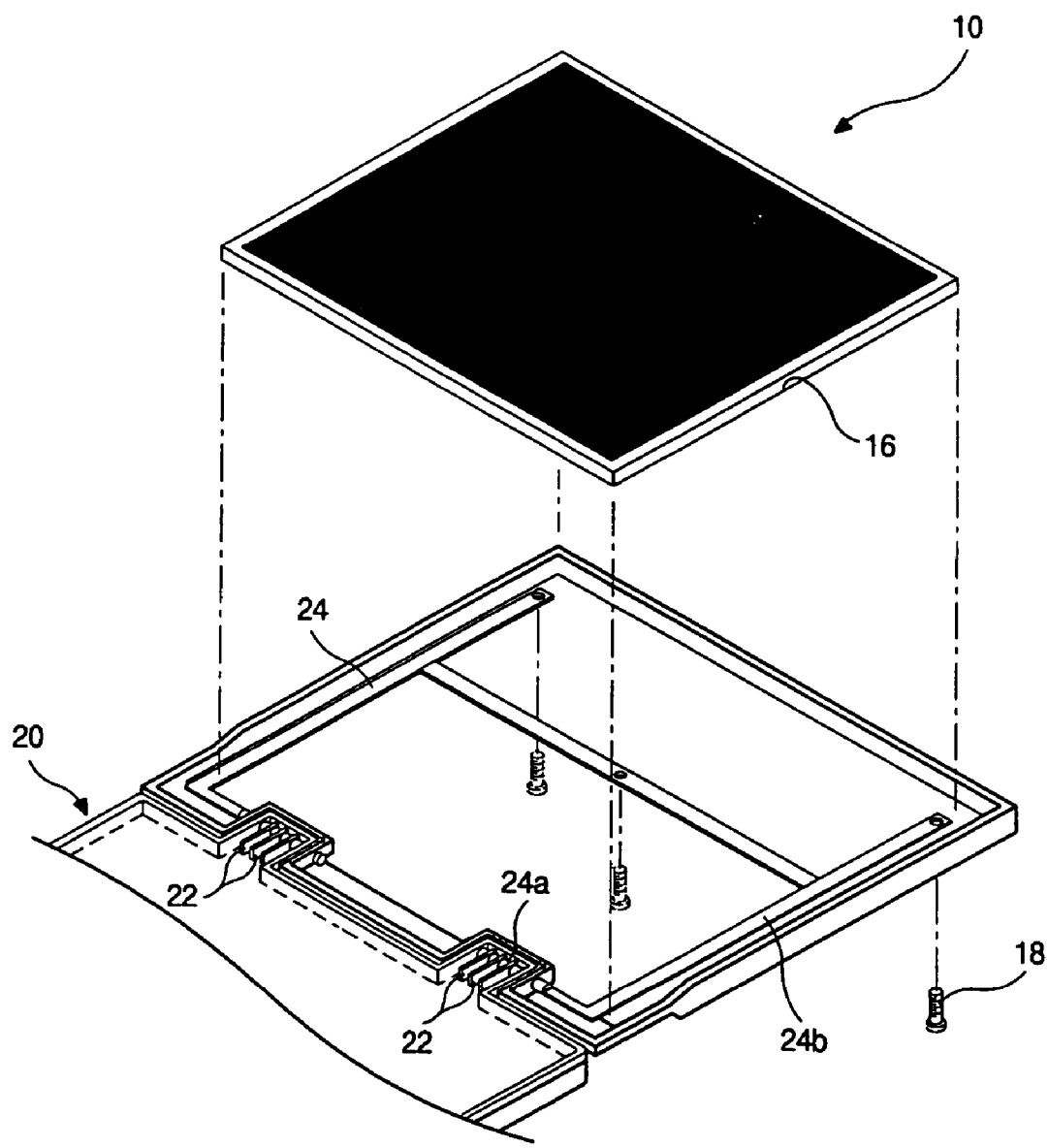

FIGS. 12-14 show three alternative embodiments of the embodiments shown in FIGS. 9 and 11. In FIG. 12, the sixth embodiment of the present invention, the hinge arm 24 has a shape of the letter "E." In FIG. 13, the seventh embodiment of the present invention, the hinge arm 24 has the shape of the letter "C." In FIG. 14, the eighth embodiment of the present invention, the hinge arm 24 has the shape of the letter "H." The fastening holes may be formed at various positions on the hinge arm 24 as desired to secure the hinge arm to the display case 30. Combinations and other variations of these different embodiments are contemplated in the present invention with the purpose of supporting the LCD panel, preferably through the back of the LCD panel and the case. For example, the seventh and eighth embodiments may be combined to provide a stronger support of the LCD panel. Moreover, the hinge mount may be fixed to the body 20 (FIG. 10) or the display case 30 (FIG. 11) in these embodiments.

The present invention contemplates the use of fastening devices other than screws. One such alternative embodiment is shown in FIGS. 15 and 16.

Figure 15:
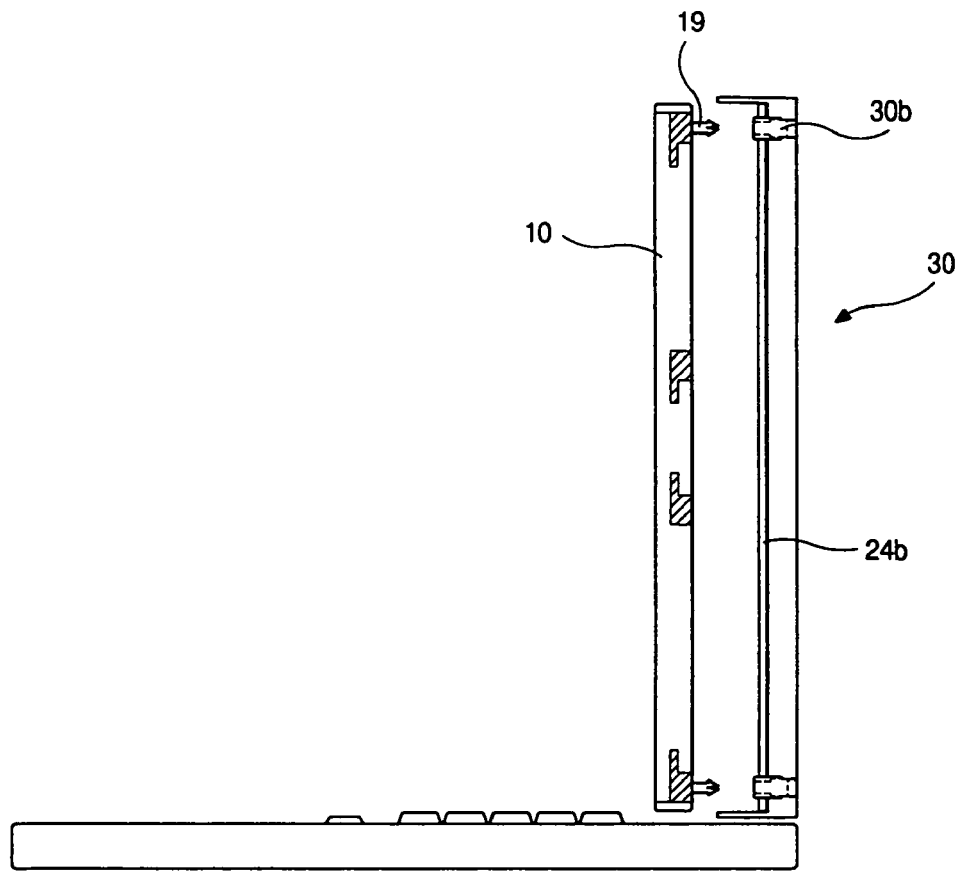
FIG. 15 is a side view showing a back mounting structure of the LCD device according to a ninth embodiment of the present invention.
Figure 16:
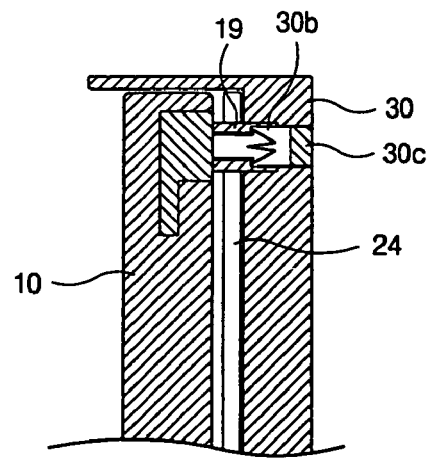
FIG. 16 is a partial sectional view showing the assembled state of the structure in FIG. 15.

FIGS. 15 and 16 show the mounting structure according to a ninth embodiment of the present invention. At the rear surface of the LCD device 10, at least one fastener such as a hook 19, preferably made of plastic or other suitable material, is formed. In the flat portion 24b of the hinge arm 24, at least one corresponding through-hole is formed. In the display case, at least one stepped hole 30b corresponding to the through-hole in the hinge arm 24 is formed to support and/or latch the fastener 19. To facilitate the disassembly or release of the fastener 19 from the hole 30b through the rear of the case 30, the hole 30b is preferably a through-hole.

To assemble the LCD device to the hinge arm 24 and display case 30, the hinge arm 24 is mounted to the hinge mount 22 (as shown in FIGS. 10 and 11) and the through-hole 24c of the hinge arm 24 and the hole 30b are coincidentally placed. Then, the LCD device 10 with at least one fastener 19 is pressed into the hole 30b and latched onto the display case 30, as shown in detail in FIG. 16. Here, the fastener 19 will slide through the hole 30b and snap into place by the protruding or wing portions of the head of the fastener 19. To dissemble the LCD device 10 from the display case 30, a device such as tweezers or other suitable tool can be adapted for squeezing the head or top portion of the fastener 19 from the back of the case 30 through the hole 30b. The fastener 19 is unlatched and can freely slide out of the hole 30b. The hole 30b can be covered by a cover 30c.

Alternatively, the fastener 19 can be formed on the case 30 and the stepped hole can be formed at the rear face of the LCD device 10 to achieve similar results.

As explained above, the mounting method according to the present invention does not require unnecessary side space for mounting the LCD device on the computer. Thus, the ratio of the display area of the LCD device to the display case can be improved and maximized.

In the above embodiments of the present invention, although the LCD device has been used as one type of flat panel display device, other flat panel display devices such as plasma display panels (PDP) and field emission displays (FED) may be used in accordance with the present invention. Moreover, in the above embodiments, other hinge mechanisms may be used such as a gear hinge as disclosed, for example, in U.S. application Ser. No. 08/937,801 filed on Sep. 25, 1997 entitled, "DISPLAY WITH GEAR TYPE HINGE," which is incorporated herein by reference.

It will be apparent to those skilled in the art that various modifications and variation can be made in the portable computer and method for mounting a flat panel display device thereon of the present invention without departing from the spirit or scope of the invention. Thus, it is intended that the present invention cover the modifications and variations of this invention provided they come within the scope of the appended claims and their equivalents.

What is claimed is:

1. A flat panel display apparatus for a computer, the flat panel display apparatus comprising:
   a housing having a front portion and a rear portion, the front portion having an opening therein;
   a flat display panel having a display area, the display area corresponding to the opening in the front portion of the housing;
   a first frame having a screw hole at a rear surface thereof;
   a second frame, wherein the flat display panel is between the first frame and the second frame; and
   a hinge extension coupled to the first frame and between the housing and the first frame, the hinge extension including a hole,
   wherein the first frame is fixed to the rear portion of the housing by a screw combined with the screw hole at the rear surface of the first frame through the hole, wherein the screw hole, the screw and the hole are located within the display area, wherein the screw hole, the screw and the hole are located behind the display area, and wherein the flat display panel only mounts to the rear portion of the housing.

2. The flat panel display apparatus according to claim 1, wherein the front portion of the housing has an opening corresponding to a viewing area of the flat display panel.

3. The flat panel display apparatus according to claim 1, wherein the screw hole includes at least two screw holes at two corners of the first frame.

4. The flat panel display apparatus according to claim 1, wherein the screw hole includes four screw holes at four corners of the first frame.

5. The flat panel display apparatus according to claim 1, further comprising a backlight unit comprising:
   a reflector unit adjacent the first frame;
   a light source unit adjacent the reflector unit; and
   a light guide unit adjacent the light source unit.

6. The flat panel display device according to claim 5, further comprising a diffuser unit and a prism unit.

7. The flat panel display device according to claim 1, wherein the screw hole, the screw and the hole are not visible from a viewing direction of the flat display panel.

8. The flat display apparatus according to claim 1, wherein the housing comprises:
   a front housing part; and
   a rear housing part wherein the flat display panel apparatus is not fixed to the front housing part.

9. The flat display apparatus according to claim 8, wherein the screw hole passes through the rear surface of the first frame.

10. The flat display apparatus according to claim 9, wherein the first frame is fixed to a rear portion of the housing with the screw hole at the rear surface of the first frame.

11. A flat panel display apparatus comprising:
    a housing having a front part and a rear part, the front part having an opening therein;
    a flat panel display device unit having a flat display panel, a backlight unit, a first frame and a second frame; and
    a hinge extension between the housing and the first frame, wherein the hinge extension includes a first plurality of screw holes located behind a display area of the flat display panel and a second plurality of screw holes are formed at a rear surface of the first frame,
    wherein the display area corresponds with the opening of the front part of the housing, wherein the flat panel display device unit and the housing are physically coupled with the hinge extension using a plurality of screws entering from an outer side of the rear part of the housing into the first plurality of screw holes through the second plurality of screw holes, wherein the first plurality of screw holes, the second plurality of screw holes and the plurality of screws are located within the display area, and wherein the flat display panel only mounts to the housing rear part.

12. The flat panel display apparatus according to claim 11, wherein a hinge arm is located between the first frame and the housing.

13. The flat panel display apparatus according to claim 11, wherein the opening corresponds to a viewing area of the flat display panel.

14. The flat panel display apparatus according to claim 11, wherein the backlight unit comprises:
    a reflector unit adjacent the first frame;
    a light source unit adjacent the reflector unit; and
    a light guide unit adjacent the light source unit.

15. The flat panel display device according to claim 14, further comprising a diffuser unit and a prism unit.

16. The flat panel display device according to claim 15, wherein the first plurality of screw holes, the second plurality of screw holes and the plurality of screws are not visible from a viewing direction of the flat display panel.

17. A mounting structure for mounting a flat panel display device, said mounting structure comprising:
    a first frame;
    a second frame, wherein a flat display panel having a display area and a light unit are fixed between said first frame and said second frame; and
    a screw hole at a rear surface of said first frame, wherein said first frame is fixed to a housing having a front portion and a rear portion, wherein the front portion has a window therein corresponding to the display area, wherein a screw is inserted from the back of the housing into the screw hole at the rear surface of the first frame through an opening in a rear surface of the housing and a hole of a hinge extension, thereby mounting the flat panel display device to the housing, wherein at least a portion of said hinge extension is positioned between the housing and said first frame and said hinge extension is coupled to said first frame, wherein the screw hole, the screw, and the hole are located within the display area, wherein the screw hole, the screw and the hole are located behind the display area, wherein the flat display panel only mounts to the rear portion of the housing.

18. The mounting structure of claim 17, wherein the screw hole includes a plurality of screw holes at the rear surface of said first frame.

19. The mounting structure of claim 18, wherein the screw includes a plurality of screws.

20. The mounting structure of claim 19, wherein the plurality of screws are inserted through corresponding openings in a rear surface of the housing and into the plurality of screw holes, respectively, at the rear surface of the first frame, thereby mounting the flat panel display device to the housing.

21. The mounting structure of claim 17, wherein said light unit is positioned between said flat display panel and said first frame.

22. The mounting structure of claim 17, wherein the unit comprises:
    a light source;
    a light guide; and
    at least one reflector.

23. A flat panel display device mounted to a housing, said flat panel display device comprising:
- a housing having a rear portion and a front portion, the front portion having a window therein;
- a first support frame;
- a second support frame;
- a flat display panel having a display area corresponding to the window and fixed between said first support frame and said second support frame;
- a backlight unit fixed between said first support frame and said second support frame; and
- a screw hole at a rear surface of said first support frame, wherein said first support frame is mounted to the housing using the screw hole at the rear surface of said first support frame wherein a screw is inserted through an opening in a rear surface of the housing and a hole of a hinge extension into the screw hole that passes through the rear surface of the first support frame such that said screw is disposed behind the display area, wherein at least a portion of the hinge extension is positioned between said first frame and the housing and the hinge extension is coupled to said first frame, wherein the flat display panel only mounts to the rear portion of the housing, and wherein the screw hole, the screw and the hole are located within the display area.

24. The flat panel display device of claim 23, wherein the screw hole includes a plurality of screw holes at the rear surface of said first support frame.

25. The flat panel display device of claim 24, wherein the screw includes a plurality of screws.

26. The flat panel display device of claim 25, wherein the plurality of screws are inserted through corresponding openings in a rear surface of the housing and into the plurality of screw holes, respectively, at the rear surface of the first support frame.

27. The flat panel display device of claim 23, wherein said backlight unit is positioned between said flat display panel and said first support frame.

28. The flat panel display device of claim 23, wherein said backlight unit comprises:
- a light source;
- a light guide; and
- at least one reflector.

29. The flat panel display device of claim 28, wherein said backlight unit further comprises:
- at least one prism.

30. The flat panel display device of claim 23, wherein said flat display panel is a liquid crystal display (LCD) panel.

31. A rear mountable flat panel display apparatus comprising:
- a housing having a front portion and a rear portion, the front portion having a window therein;
- a flat panel display including:
  - a flat display panel having a display area corresponding to the window;
  - a backlight unit;
  - a first frame having a screw hole at a rear surface thereof; and
  - a second frame, wherein the flat display panel and the backlight unit are positioned between the first frame and the second frame; and
- a hinge extension coupled to the first frame and between the housing and the first frame, the hinge extension including a hole, wherein the flat panel display is fixed to the rear portion of the housing by a screw that passes through an opening in the rear portion of the housing and the hole of the hinge extension into the screw hole that passes through the rear surface of the first frame such that the screw hole, the screw and the hole are located behind the display area, wherein the flat display panel only mounts to the rear portion, and wherein the screw hole, the screw and the hole are located within the display area.

* * * * *